United States Patent
Suzuki

(10) Patent No.: US 11,084,298 B2
(45) Date of Patent: Aug. 10, 2021

(54) PRINTING APPARATUS AND PRINTING METHOD

(71) Applicant: CANON KABUSHIKI KAISHA, Tokyo (JP)

(72) Inventor: Fumiko Suzuki, Kawasaki (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 0 days.

(21) Appl. No.: 16/519,391

(22) Filed: Jul. 23, 2019

(65) Prior Publication Data

US 2020/0039248 A1 Feb. 6, 2020

(30) Foreign Application Priority Data

Aug. 1, 2018 (JP) ................................. 2018-145430

(51) Int. Cl.
*B41J 2/21* (2006.01)
*B41J 11/00* (2006.01)
*B41J 11/46* (2006.01)
*H04N 1/60* (2006.01)
*B41J 13/00* (2006.01)
*G06K 15/10* (2006.01)
*B41J 3/60* (2006.01)

(52) U.S. Cl.
CPC ........... *B41J 2/2135* (2013.01); *B41J 11/008* (2013.01); *B41J 11/46* (2013.01); *B41J 13/009* (2013.01); *G06K 15/107* (2013.01); *H04N 1/605* (2013.01); *B41J 3/60* (2013.01)

(58) Field of Classification Search
CPC ...... B41J 2/2135; B41J 11/008; B41J 13/009; B41J 3/60; H04N 1/605; G06K 15/107
See application file for complete search history.

(56) References Cited

U.S. PATENT DOCUMENTS 6,991,387 B2 * 1/2006 Kida .................... B41J 11/46
101/481
7,458,655 B2 12/2008 Takahashi et al.

FOREIGN PATENT DOCUMENTS

JP 2005-081569 A 3/2005

* cited by examiner

*Primary Examiner* — Geoffrey S Mruk
(74) *Attorney, Agent, or Firm* — Venable LLP

(57) ABSTRACT

An object of the present invention is to efficiently perform a reading operation for printing position adjustment with high accuracy. A printing apparatus prints, on a print medium, adjustment patterns for adjusting a printing position on the print medium and corresponding respectively to printing position adjustment items. In this printing, the printing apparatus prints the adjustment patterns while conveying the print medium in a forward direction with a conveying unit. Then, the conveying unit conveys the print medium in a backward direction until the adjustment patterns are moved beyond a reading position of a reading unit in the backward direction. Thereafter, the conveying unit conveys the print medium in the forward direction again to cause the adjustment patterns to reach the reading position. Thereafter, the reading unit reads the adjustment patterns continuously at the reading position while the conveying unit conveys the print medium in the forward direction.

22 Claims, 14 Drawing Sheets

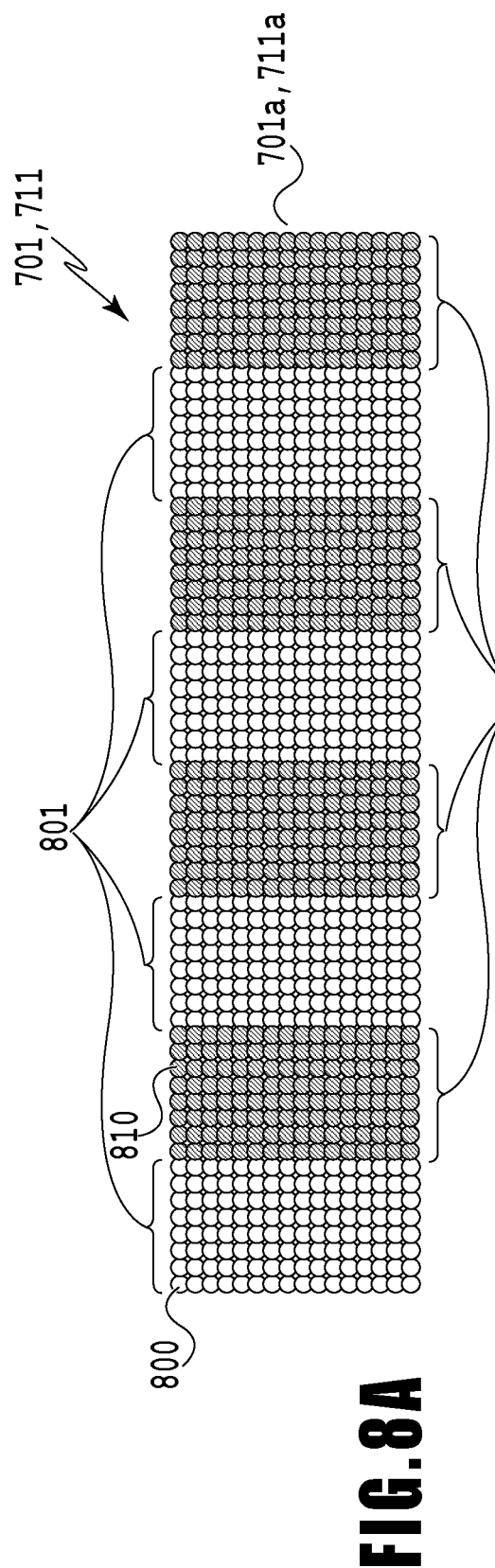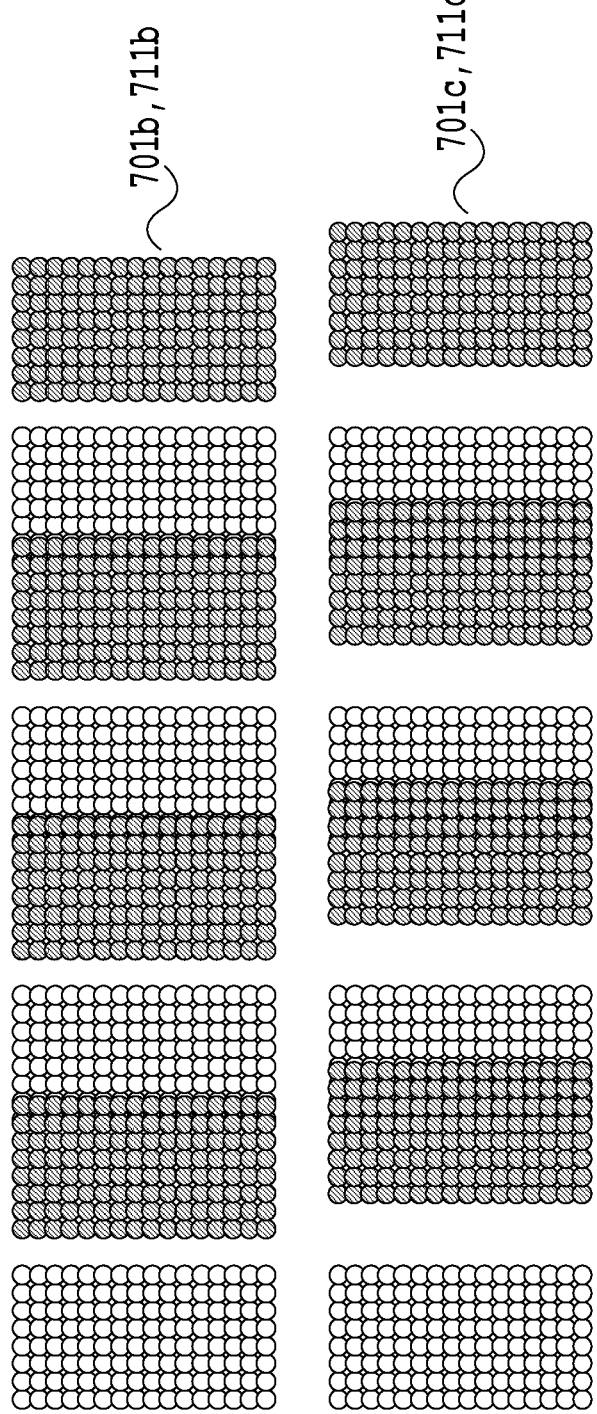

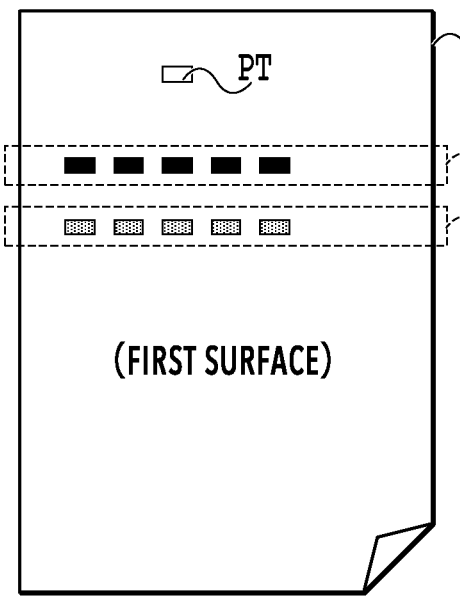
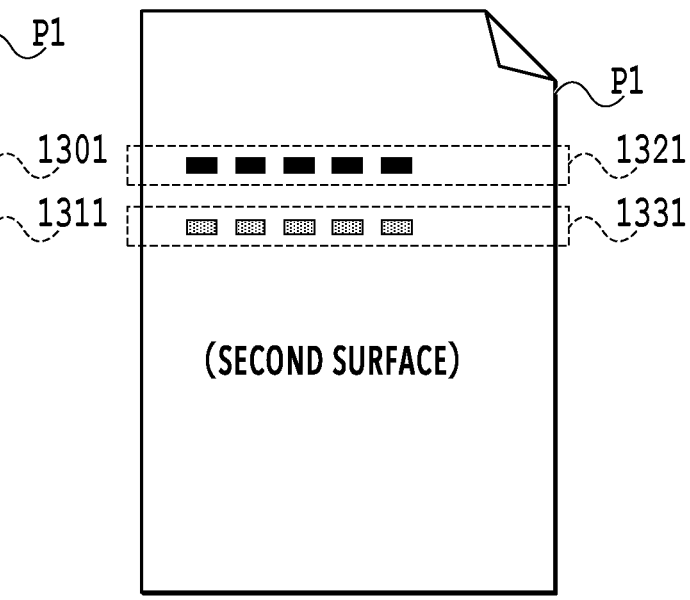
FIG.14A     FIG.14B
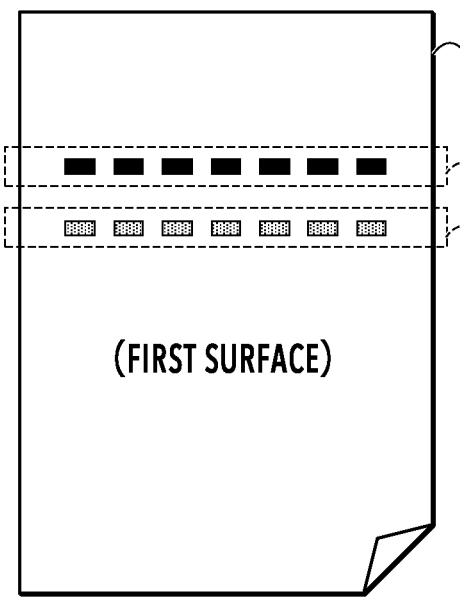
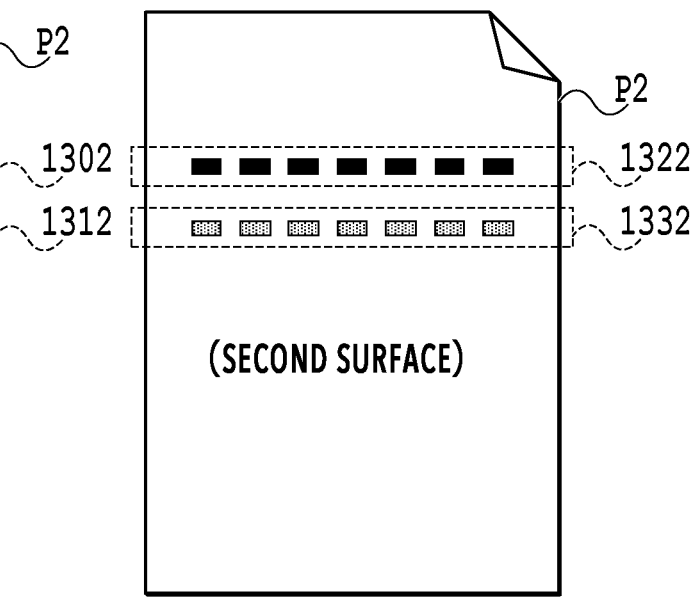
FIG.14C     FIG.14D

PRINTING APPARATUS AND PRINTING METHOD

BACKGROUND OF THE INVENTION

Field of the Invention

The present invention relates to a printing apparatus capable of printing and reading adjustment patterns for adjusting a printing position on a print medium and a printing method.

Description of the Related Art

In order for an inkjet printing apparatus to perform printing with high image quality, landing positions of ink applied to a print medium need to be adjusted (printing position adjustment). To this end, a serial inkjet printing apparatus which performs printing while moving a print head in a main scanning direction adjusts the landing positions of ink in the following way.

In adjustment of printing positions in forward scanning and return scanning in bidirectional printing, printing position adjustment patterns such as ruled lines are printed on the print medium with relative printing position conditions varied by adjusting print timings in the forward scanning and the return scanning. Then, the optimal printing position condition is selected based on the printing position adjustment patterns.

As a method of selecting the optimal printing position condition based on the printing position adjustment patterns, Japanese Patent Laid-Open No. 2005-81569 discloses a method in which printing position adjustment patterns are read by using an optical sensor provided near a print head and printing position adjustment is performed automatically based on results of the reading. The optical sensor is fixed to a carriage at a position upstream of the print head in a conveyance direction of the print medium. Accordingly, every time a printing position adjustment pattern is printed, the print medium is conveyed in the backward direction opposite to the conveyance direction and then the printing position adjustment pattern is read. The conveyance of the print medium is performed by a conveyance mechanism including a conveyance roller and a sheet discharge roller arranged downstream of the conveyance roller.

In the printing apparatus as described above, the conveyance amount of the sheet discharge roller is set slightly greater than the conveyance amount of the conveyance roller and the print medium is thereby conveyed in a flat state with tension. This suppresses fluctuation in the distance between the print head and the print medium and the printing and the reading can be stably performed. However, in the case where such a conveyance mechanism conveys the print medium in the backward direction opposite to the conveyance direction, there is the following risk: since the conveyance amount of the sheet discharge roller is greater than the conveyance amount of the conveyance roller, slack is formed in the print medium and the reading accuracy of the optical sensor decreases. In view of this, a method is employed in which, after the printing of the printing position adjustment pattern, the print medium is conveyed in the backward direction opposite to the conveyance direction in a distance slightly longer than the distance to the optical sensor and then conveyed in the forward direction to remove slack in the print medium.

However, in the case where the aforementioned control is performed for every reading operation, the conveyance distance as a whole is long and the adjustment takes long time.

SUMMARY OF THE INVENTION

An object of the present invention is to efficiently perform a reading operation for printing position adjustment with high accuracy.

The present invention is a printing apparatus comprising: a conveying unit configured to convey a print medium in a forward direction being a direction in which the print medium is discharged and in a backward direction opposite to the forward direction while applying tension to the print medium; a printing unit configured to perform printing on the print medium conveyed by the conveying unit; a print controlling unit configured to control the printing unit to cause the printing unit to print a plurality of adjustment patterns on the print medium, the adjustment patterns being for use to adjust a printing position of the printing unit on the print medium and corresponding respectively to a plurality of printing position adjustment items; and a reading unit configured to read the adjustment patterns printed on the print medium at a reading position on a conveyance path of the conveying unit, wherein the print controlling unit controls the printing unit to cause the printing unit to print the plurality of adjustment patterns on the print medium while the conveying unit conveys the print medium in the forward direction, then, the conveying unit conveys the print medium in the backward direction until the plurality of the adjustment patterns are moved beyond the reading position in the backward direction and then conveys the print medium in the forward direction again to cause the adjustment patterns to reach the reading position, and the reading unit continuously reads the plurality of adjustment patterns at the reading position while the conveying unit conveys the print medium in the forward direction.

The present invention is a printing method of performing printing by using: a conveying unit configured to convey a print medium in a forward direction being a direction in which the print medium is discharged and in a backward direction opposite to the forward direction while applying tension to the print medium; a printing unit configured to perform printing on the print medium conveyed by the conveying unit; a print controlling unit configured to control the printing unit to cause the printing unit to print a plurality of adjustment patterns on the print medium, the adjustment patterns being for use to adjust a printing position of the printing unit on the print medium and corresponding respectively to a plurality of printing position adjustment items; and a reading unit configured to read the adjustment patterns printed on the print medium at a reading position on a conveyance path of the conveying unit, the printing method comprising the steps of: causing the printing unit to print the plurality of adjustment patterns on the print medium while causing the conveying unit to convey the print medium in the forward direction; causing the conveying unit to convey the print medium in the backward direction until the plurality of the adjustment patterns are moved beyond the reading position in the backward direction; after the print medium is conveyed in the backward direction, causing the conveying unit to convey the print medium in the forward direction again to cause the adjustment patterns to reach the reading position; and after the adjustment pattern reaches the reading position, causing the reading unit to continuously read the plurality of adjustment patterns at the reading position while causing the conveying unit to convey the print medium in the forward direction.

The present invention can efficiently perform a reading operation for printing position adjustment with high accuracy.

Further features of the present invention will become apparent from the following description of exemplary embodiments with reference to the attached drawings.

BRIEF DESCRIPTION OF THE DRAWINGS

FIGS. 8A to 8C are views illustrating a rough adjustment pattern;

FIGS. 14A to 14D are views illustrating a layout of printing position adjustment patterns in the second embodiment.

DESCRIPTION OF THE EMBODIMENTS

Embodiments of the present invention are described below with reference to the attached drawings. Note that the embodiments described below are merely examples for explaining the present invention and the present invention is not limited by the following embodiments.

1. Basic Configuration

Figure 1A:
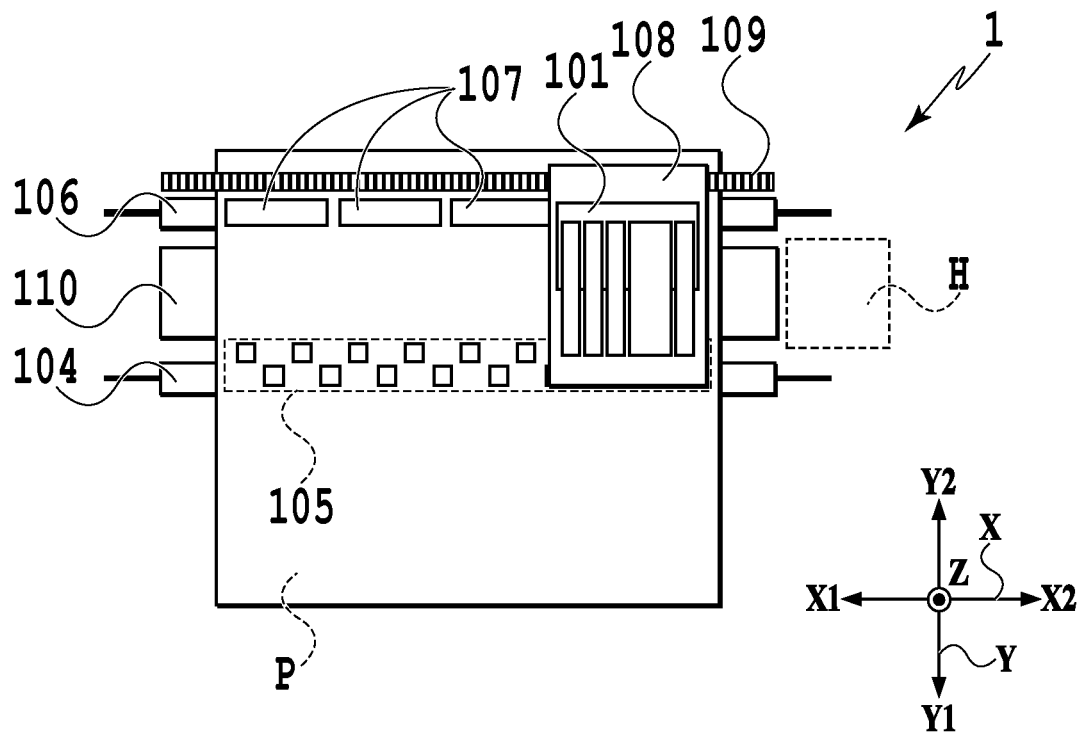
FIG. 1A is a plan view illustrating an inkjet printing apparatus.
Figure 1B:
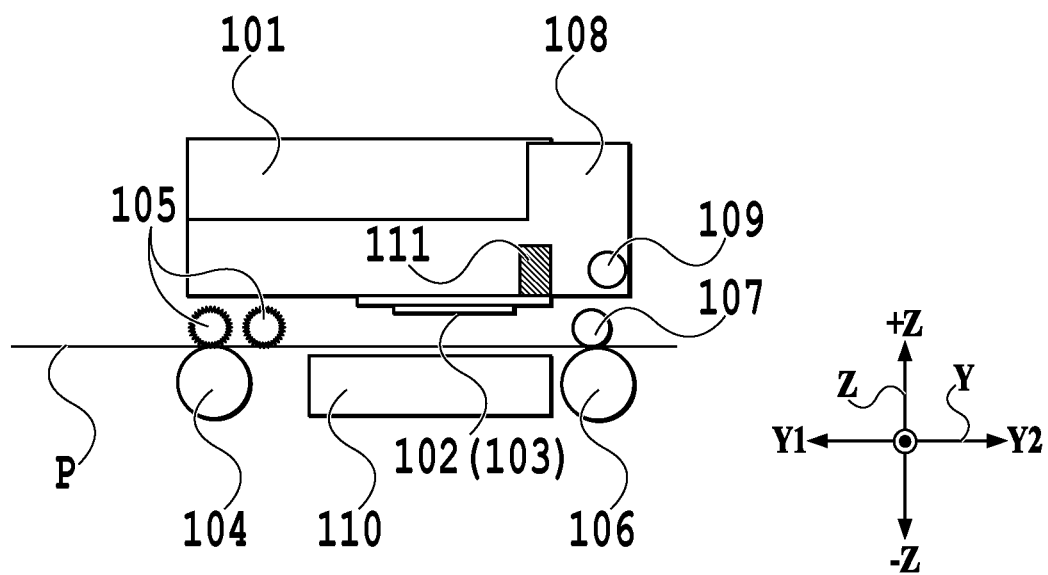
FIG. 1B is a side view illustrating the inkjet printing apparatus.

FIGS. 1A and 1B are a plan view and a side view for explaining a schematic configuration of an inkjet printing apparatus (hereafter, simply referred to as printing apparatus) to which the present invention is applied. A print medium P supplied into the printing apparatus 1 is moved in a Y direction (conveyance direction) with rotation of a roller pair including conveyance rollers 106 and pinch rollers 107 and a roller pair including sheet discharge rollers 104 and spurs 105 while being held by these roller pairs between the rollers therein. A carriage 108 which is supported and guided by a guide shaft 109 extending in an X direction and which is capable of reciprocating in a main scanning direction (X direction) intersecting (in the embodiment, orthogonal to) the conveyance direction is arranged between the two roller pairs. A print head 101 capable of ejecting inks is mounted on the carriage 108.

While the carriage 108 moves in the X-direction, the print head 101 ejects the inks in a −Z direction based on image data and prints an image of one column on the print medium P located on a conveyance path. Note that an operation of the print head 101 moving in the main scanning direction while ejecting the inks is referred to as print scanning In the case where the print scanning for one column is completed, the conveyance rollers 106 and the sheet discharge rollers 104 rotate and convey the print medium in the Y direction, that is, a forward direction (Y1 direction). Alternately repeating the print scanning and the conveyance operation as described above forms an image on the print medium P step by step. The print medium P is supported on a back surface by a platen 110 in a region where the print head 101 performs printing and a printing surface is generally maintained in a flat state. Note that the Z direction is a direction substantially perpendicular to the printing surface of the print medium P.

The print head 101 of the embodiment is configured to be capable of ejecting five types of inks which include cyan, magenta, yellow, and black dye inks and a black pigment ink Five ink tanks for supplying these inks are mounted on the carriage 108 together with the print head 101. In the case where maintenance processing of maintaining and recovering an ink ejection performance of the print head 101 is to be performed, the carriage 108 moves to a home position H in FIG. 1A. A mechanism for performing recovery processing such as, for example, suction processing, wiping processing, and preliminary ejection processing on the print head 101 is arranged at the home position H.

Figure 2:
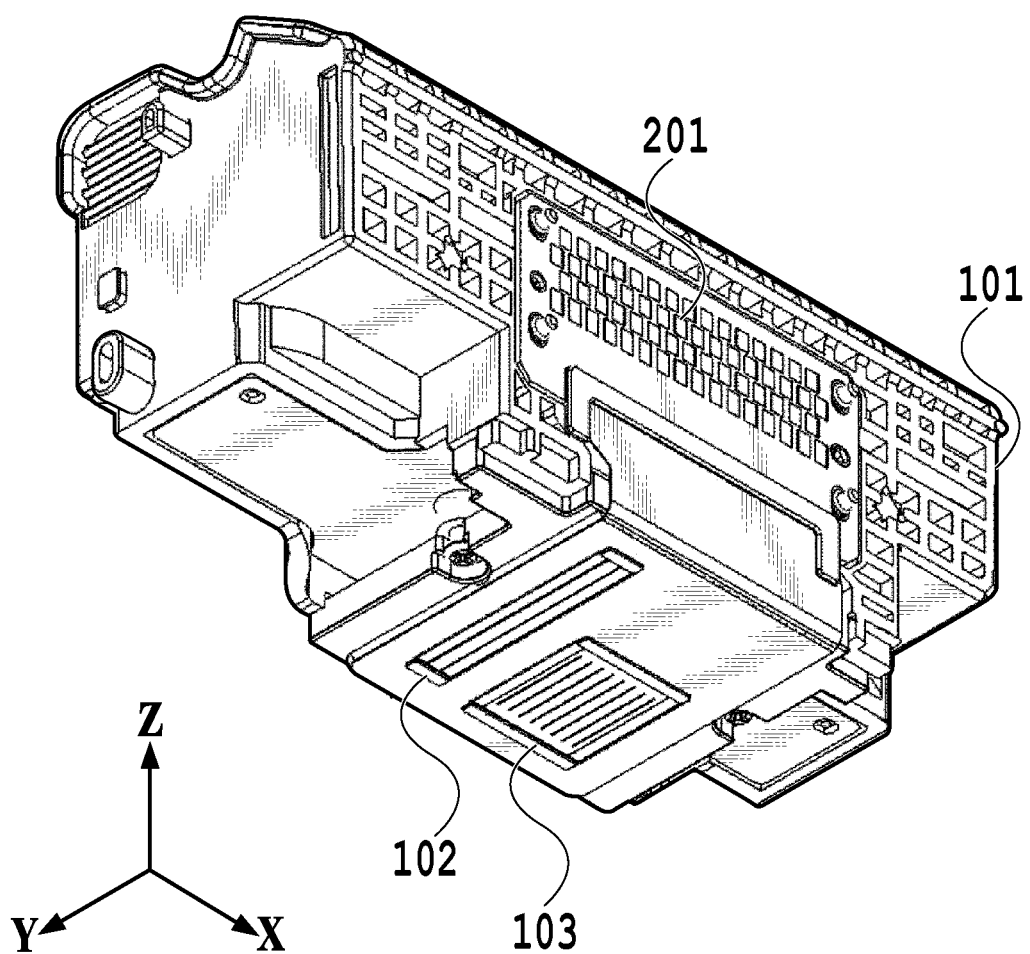
FIG. 2 is a perspective view illustrating a print head.

FIG. 2 is a perspective view illustrating the print head 101. The print head 101 receives electric power and drive signals necessary for the ejection from a printing apparatus main body via contact pads 201. Moreover, the print head 101 is provided with print chips including multiple ejection ports from which the inks can be ejected as droplets. The print head 101 of the embodiment is provided with a print chip 102 for ejecting the pigment ink and a print chip 103 for ejecting the dye inks. In the print chip 102 for the pigment ink, multiple ejection ports for ejecting the black pigment ink as droplets are aligned in the Y direction to form ejection port arrays.

Meanwhile, in the print chip 103, multiple ejection ports for ejecting multiple types of dye inks such as the cyan ink, the magenta ink, the yellow ink, and the black ink are aligned in the Y direction to form ejection port arrays (not illustrated) for the inks. The aforementioned ejection port arrays formed in the print chips 102, 103 are arranged side by side in the X direction.

Figure 3:
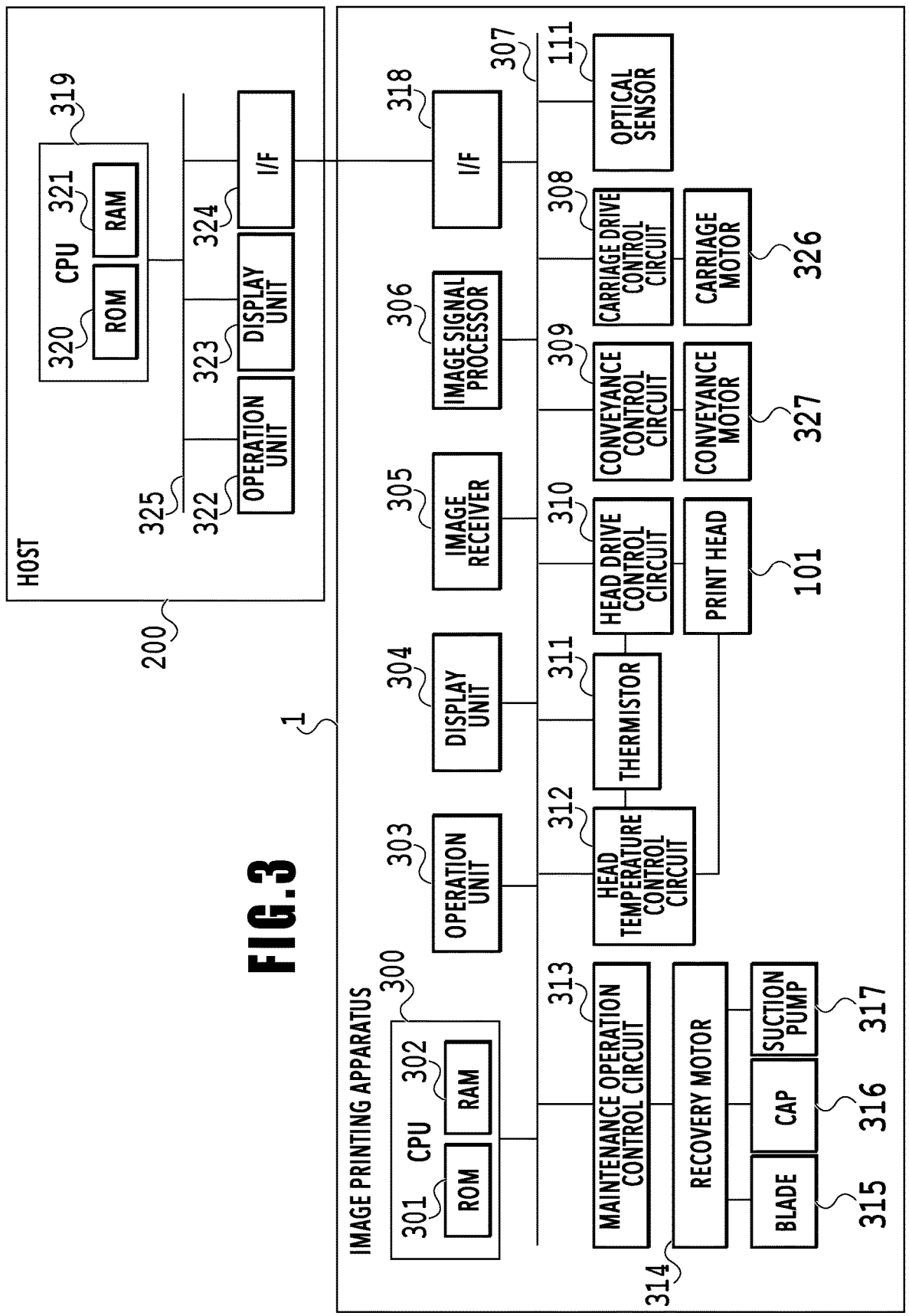
FIG. 3 is a block diagram illustrating a schematic configuration of a control system in the inkjet printing apparatus.

FIG. 3 is a block diagram illustrating a configuration of a control system relating to the printing apparatus 1. The control system of the embodiment is formed of the printing apparatus 1 and a host apparatus 200 connected to the printing apparatus 1.

Elements of the printing apparatus 1 can be roughly divided into software control units and hardware processing units. The software control units include an image receiver 305, an image signal processor 306, and a processing unit such as CPU 300 which controls the printing apparatus 1 as a whole. The image receiver 305 temporarily stores pieces of image data received from the host apparatus 200 via an interface (I/F) 318. The pieces of image data inputted into the image receiver 305 are processed one by one by the image signal processor 306 into pieces of data (print data) suitable for printing by the printing apparatus 1.

Meanwhile, the hardware processing units include processing units such as an operation unit 303, a display unit 304, a maintenance operation control circuit 313, a head temperature control circuit 312, a head drive control circuit 310, a carriage drive control circuit 308, and a conveyance control circuit 309. The operation unit 303 is a portion where a user inputs various commands. The display unit 304 displays an image to provide information to the user. The maintenance operation control circuit 313 controls operations of a blade 315, a cap 316, a suction pump 317, and the like via a recovery motor 314 and performs various kinds of maintenance processing on the print head 101 moved to the home position H.

The head drive control circuit 310 controls drive (ink ejection operation) of the print head 101 according to the print data generated by the image signal processor 306 and to a detection result of a thermistor 311. The head temperature control circuit 312 adjusts the temperature of the print head 101 based on the detection result of the thermistor 311. The carriage drive control circuit 308 controls drive of a carriage motor 326 to control movement (reciprocating scanning) of the carriage 108 in the X direction. The conveyance control circuit 309 controls drive of a conveyance motor 327 to control rotation of the conveyance rollers 106 and the sheet discharge rollers 104 and control conveyance of the print medium P in the Y direction. An optical sensor 111 detects printing position adjustment patterns printed on the print medium P. The control circuits described above are connected to each other via a bus line 307 and are controlled by the CPU 300.

The CPU 300 includes a ROM 301 and a RAM 302 and controls the entire printing apparatus 1 according to programs and various parameters stored in the ROM 301 while utilizing the RAM 302 as a work area. For example, in the case of receiving a print command, the CPU 300 sets a drive pulse to be applied to a heater of the print head 101 according to a table stored in advance in the ROM 301 and provides the drive pulse to the head drive control circuit 310. Moreover, based on a print mode set by the user, the CPU 300 reads drive conditions of the carriage 108 and conveyance conditions of the print medium corresponding to the set print mode from a table stored in advance in the ROM 301 and provides the read conditions to the carriage drive control circuit 308 and the conveyance control circuit 309. Furthermore, a timing chart program for executing the maintenance processing of the print head 101 is also stored in the ROM 301. The CPU 300 controls the maintenance operation control circuit 313 and the head drive control circuit 310 according to the timing chart program and executes a preliminary ejection operation and a suction recovery operation as necessary. As described above, the CPU 300 functions as a print controlling unit, a reading control unit, a conveyance control unit, and a relative movement control unit in the present invention. Moreover, the CPU 300 performs processing as an adjustment value setting unit which sets adjustment values for adjusting printing positions.

An apparatus such as a general PC as well as a mobile phone, a smartphone, a tablet, a digital camera, and a mobile or stationary terminal can be employed as the host apparatus 200 connected to the printing apparatus 1. The internal configuration of the host apparatus 200 varies depending on the main purpose of the apparatus but basically includes a CPU 319, an operation unit 322, a display unit 323, and an interface (I/F) 324. These units are electrically connected to one another via a bus line 325. For example, a keyboard and a mouse can be employed as the operation unit 322. For example, a LCD or the like can be employed as the display unit 323.

Figure 4:
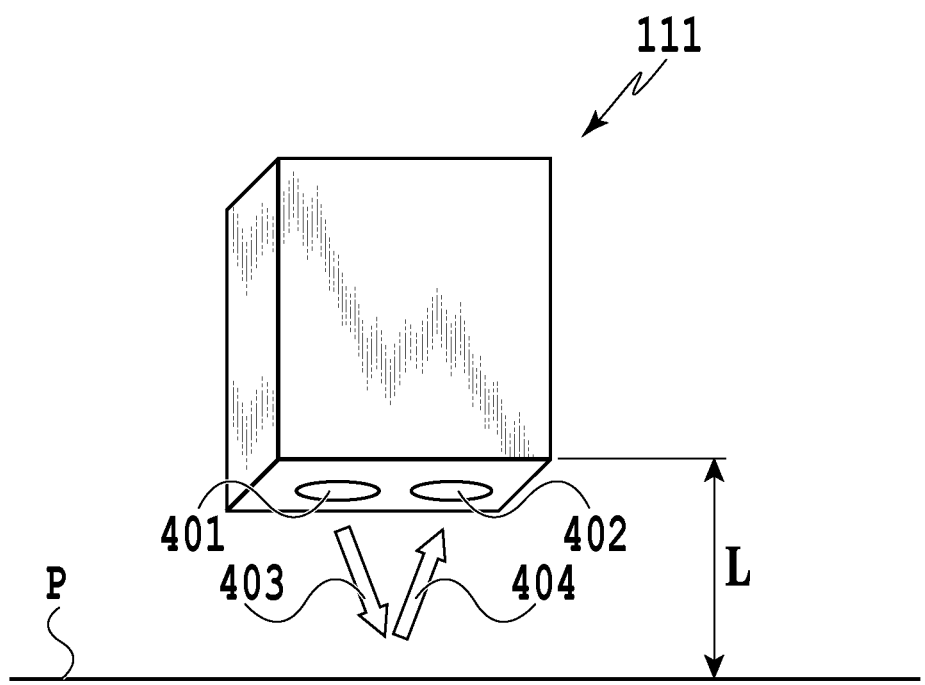
FIG. 4 is a view schematically illustrating an optical sensor.

FIG. 4 is a schematic view for explaining the optical sensor 111 used in the embodiment. The optical sensor 111 is used to read the printing position adjustment patterns and the like printed on the print medium P. The optical sensor 111 includes a light emitter 401 and a light receiver 402 and is attached to the carriage 108. Light 403 emitted from the light emitter 401 is reflected on the print medium P and the reflected light 404 is detected by the light receiver 402. A detection signal of the optical sensor 111 is transmitted to a control circuit formed on a circuit board of the printing apparatus via a carriage flexible flat cable (not illustrated) and is converted to a digital signal by an A/D converter connected to the control circuit.

The optical sensor 111 is arranged to be attached to the carriage 108 at such a position that the optical sensor 111 does not pass a portion where the ejection port arrays of the print head 101 travel in the print scanning. This is to avoid the case where airborne droplets of the inks and the like attach to the optical sensor 111. Moreover, in the conveyance mechanism (conveying unit) configured as in FIG. 1B, force of the pinch rollers 107 pressing the print medium is greater than that of the spurs 105. Accordingly, the optical sensor 111 is arranged in an upstream portion of the carriage 108 in the conveyance path which is close to the pinch rollers 107.

An ink with a color tone suitable for light color of the optical sensor 111 among the inks used in the printing apparatus 1 is used as an ink to be detected by the optical sensor 111. For example, an ink of a color with excellent light absorption characteristics for light color of a red LED or an infrared LED is used and dots formed by using this ink are set as detection targets. In the embodiment, the black or cyan ink is preferably used from the viewpoint of light absorption characteristics. Meanwhile, if a portion printed by using the ink of magenta, yellow, or the like is detected by the optical sensor 111, it is difficult to obtain sufficient density characteristics and S/N ratio. In this way, it is preferable that the light color depending on the characteristics and the like of the LED be selected corresponding to the ink color.

Figure 5:
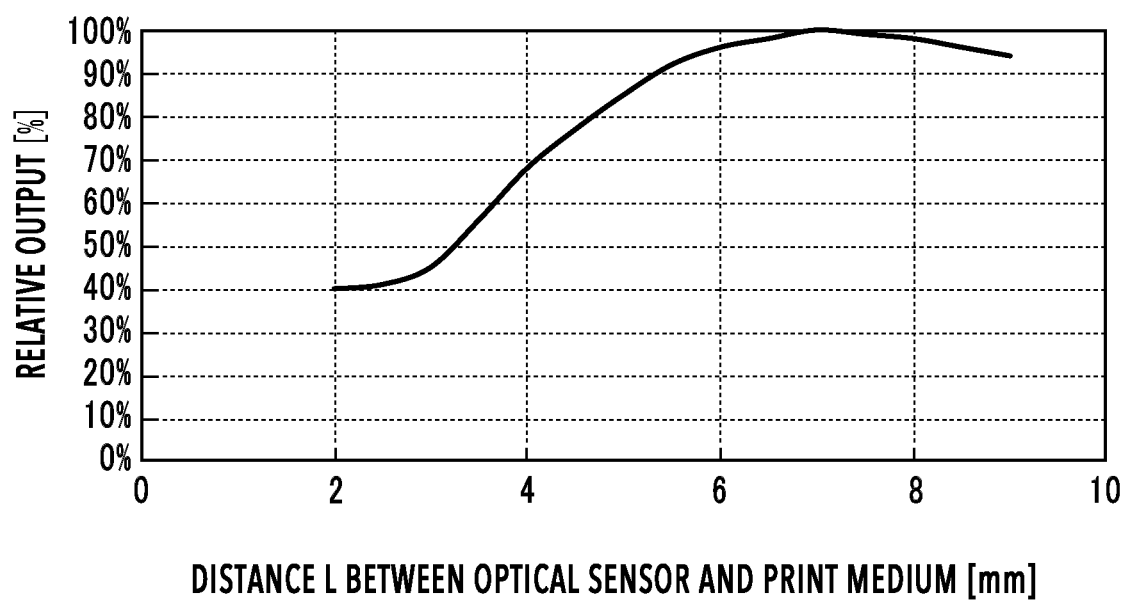
FIG. 5 is a graph illustrating an example of an output characteristic of the optical sensor.

FIG. 5 is a graph illustrating an example of an output characteristic of a reflection type optical sensor 111 as illustrated in FIG. 4. The horizontal axis represents the distance L (see FIG. 4) between the optical sensor 111 and the print medium P, and the vertical axis represents a relative output (voltage value) of the optical sensor 111. The output curve illustrated in FIG. 5 illustrates that the relative output voltage changes with a change in the distance L. In the embodiment, the optical sensor 111 reads the later-described printing position adjustment patterns printed on the print medium P, and the printing positions are adjusted based on the results of this reading. Accordingly, in order to perform the printing position adjustment with high accuracy, the reading needs to be performed with the change in the distance L between the optical sensor 111 and the print medium P suppressed as much as possible.

2. Characteristic Configuration

Characteristics of a printing position adjustment method employed in the embodiment are described below.

First Embodiment

Figure 6:
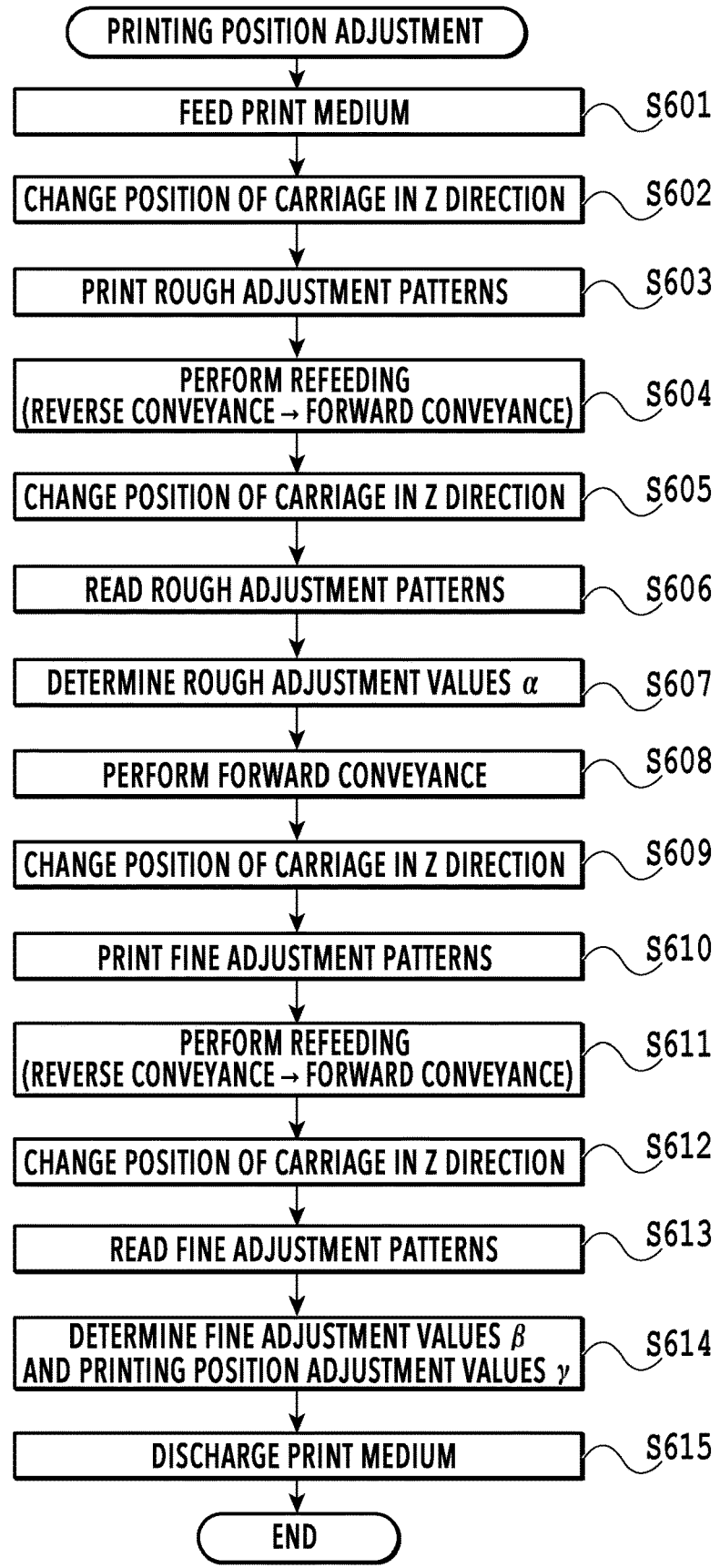
FIG. 6 is a flowchart illustrating a printing position adjustment process in a first embodiment.
Figure 7:
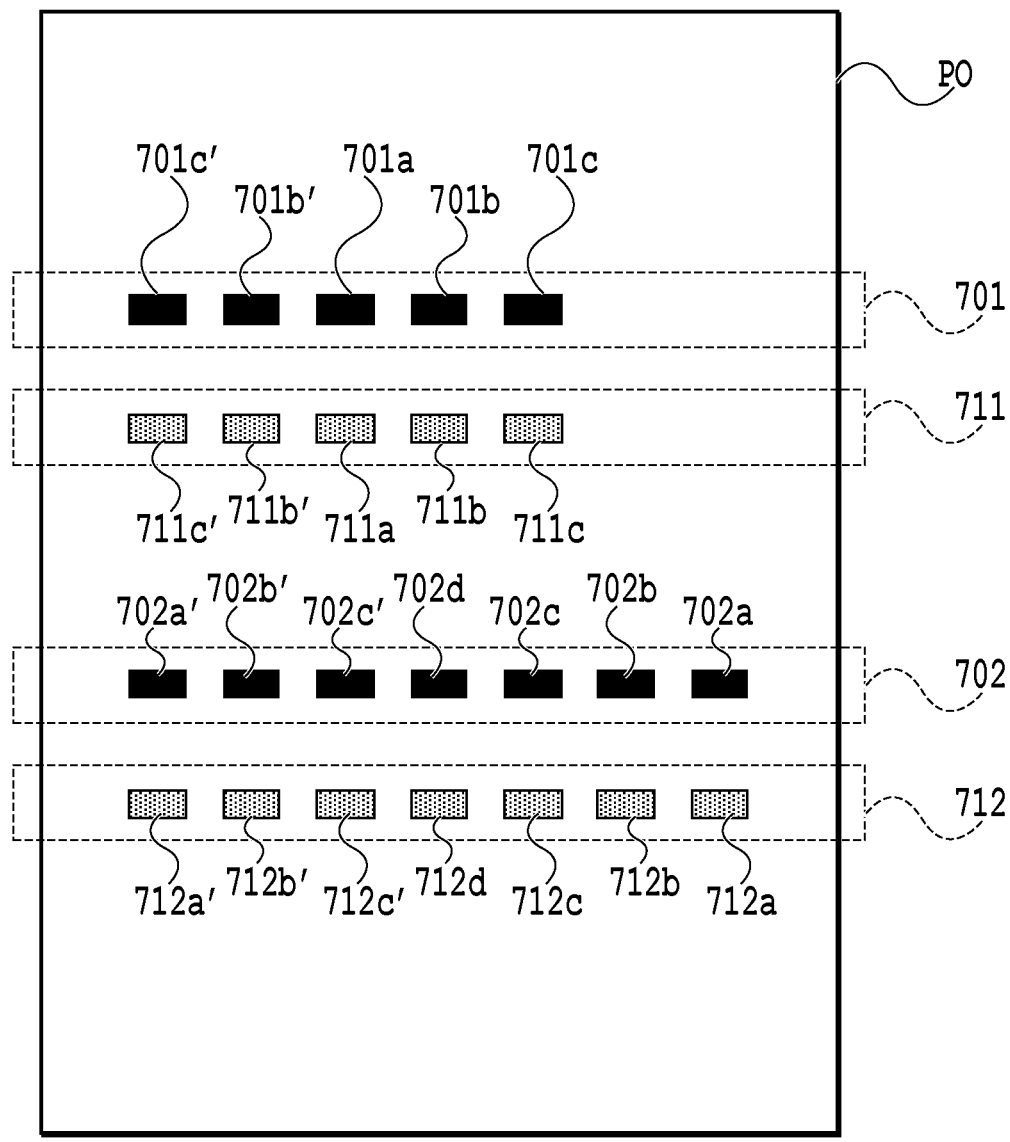
FIG. 7 is a view illustrating a layout of printing position adjustment patterns in the first embodiment.

FIG. 6 is a flowchart illustrating an example of a printing position adjustment process in a first embodiment. FIG. 7 is a view illustrating an example of a layout of the printing position adjustment pattern. Note that, in the flowchart to be described below, "S" denotes steps executed in the flowchart.

There are various printing position adjustment items (hereafter, simply referred to as adjustment items) for optimizing the printing position of the printing apparatus 1 on the print medium P, as described herein. Examples of the adjustment items are adjustment of relative positional relationships between a position where a predetermined ejection port array performs printing in a forward path (hereafter, referred to as forward printing position) and a position where the predetermined ejection array performs printing in a return path (hereafter, referred to as return printing position), adjustment of relative positional relationships between printing positions of different nozzle arrays, and the like. Moreover, other examples of the adjustment items are adjustment of relative positional relationships between a printing position of an odd-number nozzle array and a printing position of an even-number nozzle array in the multiple nozzle arrays ejecting the same ink, and the like. Among such various adjustment items, an example in which two adjustment items are executed is described as an example in the embodiment. In this example, the first adjustment item is adjustment of the relative positional relationships between the forward printing position and the return printing position of the ejection port array which ejects the black ink. The second adjustment item is adjustment of relative positional relationships between the forward printing position and the return printing position of the ejection port array which ejects the cyan ink.

First, in S601, a print medium P0 to be used for printing of the printing position adjustment pattern is fed and conveyed to a region where the print medium P0 is held by the roller pair including the conveyance rollers 106 and the pinch rollers 107 and the roller pair including the sheet discharge rollers 104 and the spurs 105 between these rollers. Next, in S602, the position of the carriage 108 in the Z direction is adjusted such that the distance from an ejection port surface (surface in which the ejection ports are formed) of the print head 101 mounted on the carriage 108 to the printing surface of the print medium is set to a distance suitable for printing. Hereafter, the distance from the ejection port surface of the print head 101 to the printing surface of the print medium is referred to as sheet gap.

Next, in S603, a rough adjustment pattern 701 corresponding to the aforementioned first adjustment item and a rough adjustment pattern 711 corresponding to the second adjustment item are printed (see FIG. 7). The rough adjustment pattern 701 is a pattern for roughly adjusting relative positional relationships between a printing position in forward printing using the black pigment ink and a printing position in return printing using the same. Moreover, the rough adjustment pattern 711 is a pattern for roughly adjusting relative positional relationships between a printing position in forward printing using the cyan ink and a printing position in return printing using the same. These rough adjustment patterns 701, 711 are formed of multiple (five in each rough adjustment pattern) patches (pattern forming elements) 701a, 701b, 701c, 701b', 701c' and 711a, 711b, 711c, 711b', 711c' printed with the printing positions in the return printing shifted relative to the printing position in the forward printing at pitches of 300 dpi resolution. Details of the rough adjustment patterns are described later.

Next, in S604, the print medium P0 on which the rough adjustment patterns 701, 711 are formed is conveyed in a backward direction (Y2 direction) and then conveyed in a forward direction (Y1 direction) to be re-fed for reading of the rough adjustment patterns. In the conveyance of the print medium P0 in the backward direction, the print medium P0 is conveyed in a distance greater than a distance in which the rough adjustment pattern 701 corresponding to the first adjustment item reaches the position of the optical sensor 111. Specifically, the print medium P0 is conveyed in the backward direction such that the rough adjustment pattern 701 is located upstream of the position of the optical sensor 111 in the forward conveyance direction. This operation is performed to remove slack in the print medium P0, caused by a difference in the conveyance amount between the conveyance rollers 106 and the sheet discharge rollers 104 in the conveyance in the backward direction, by conveying the print medium P0 in the forward direction (Y1 direction) after the conveyance in the backward direction. Note that the conveyance in the forward direction is performed with tension applied such that the print medium P0 is pulled. This is achieved by, for example, causing the sheet discharge rollers 104 to rotate more than the conveyance rollers 106, so that the print medium P0 is pulled toward the sheet discharge rollers 104. However, since the sheet discharge rollers 104 are caused to rotate more than the conveyance rollers 106 also in the conveyance in the backward direction, slack is formed as described above.

Next, in S605, the position of the carriage 108 in the Z direction is changed. As illustrated in FIG. 5, the output characteristic of the optical sensor 111 employed in the embodiment is stable in the case where the distance L between the optical sensor 111 and the print medium P is about 7 mm. Accordingly, in S605, the position of the carriage 108 is set such that the distance L is 7 mm.

Next, in S606, the rough adjustment patterns 701, 711 corresponding respectively to the first adjustment item and the second adjustment item are read. Specifically, first, the print medium P0 is conveyed in the forward direction (Y1 direction) such that the rough adjustment pattern 701 corresponding to the first adjustment item is disposed at the position of the optical sensor 111. Then, the carriage 108 performs scanning in the main scanning direction and the optical sensor 111 reads the rough adjustment pattern 701. Next, the print medium P0 is conveyed in the forward direction such that the rough adjustment pattern 711 corresponding to the second adjustment item is moved to the position of the optical sensor 111. Thereafter, the carriage 108 performs scanning in the main scanning direction and the optical sensor 111 reads the rough adjustment pattern 711.

In the embodiment, the multiple printed adjustment patterns are continuously read. Accordingly, the time required to print and read the adjustment patterns can be greatly reduced from that in a conventional printing apparatus in which printing and reading of the adjustment patterns are alternately performed.

In the conventional printing apparatus, the operation of conveying the print medium in the backward direction for the reading operation needs to be performed twice and slack is formed in the print medium in every operation. In order to remove this slack, the printing position of each pattern needs to be moved back upstream of the position of the optical sensor and this operation needs to be performed twice. Meanwhile, in the embodiment, the operation of conveying the print medium in the backward direction for the reading operation is performed once. Accordingly, the operation of moving back the printing position of the adjustment pattern upstream of the position of the optical sensor 111 to remove slack formed in the conveyance in the backward direction only needs to be performed once. Thus, the conveyance amount in the conveyance operation in the backward direction and the time for conveying the print medium in the backward direction are reduced from those in the conventional printing apparatus. Although the example of printing two adjustment patterns is described herein, the greater the number of the adjustment items is, the more remarkable the difference in time required for the printing and reading of the adjustment patterns on the print medium is between the embodiment and the conventional printing apparatus. This configuration enables an efficient and accurate reading operation for the adjustment of the printing position and can improve accuracy and throughput as a printing apparatus.

Next, in step S607, rough adjustment values α (α1, α2) are determined based on the reading results of the rough adjustment patterns 701, 711 corresponding to the respective adjustment items. Specifically, the rough adjustment value α1 for the first adjustment item and the second rough adjustment value α2 for the second adjustment item are determined. Note that, although the reading operation of the adjustment patterns and the determination of the adjustment values are performed in separate steps in this example, the adjustment value may be determined every time an adjustment pattern is read.

Next, in S608, the print medium P0 is conveyed in the forward direction until the rough adjustment pattern 711 is disposed downstream of the scanning region of the print head 101. Thereafter, in step S609, the carriage 108 is moved in the Z direction and the same sheet gap as in the printing of the rough adjustment patterns 701, 711 is set.

Next, in S610, a fine adjustment pattern 702 corresponding to the first adjustment item and a fine adjustment pattern 712 corresponding to the second adjustment item are printed (see FIG. 7). The fine adjustment pattern 702 is a pattern for finely adjusting the relative positional relationships between the printing position in the forward printing using the black pigment ink and the printing position in the return printing using the same. Moreover, the fine adjustment pattern 712 is a pattern for finely adjusting relative positional relationships between the printing position in the forward printing using the cyan ink and the printing position in the return printing using the same. These fine adjustment patterns 702, 712 are patterns formed of multiple (seven in each fine adjustment pattern) patches 702a, 702b, 702c, 702d, 702a', 702b', 702c' and 712a, 712b, 712c, 712d, 712a', 712b', 712c' printed with the printing position shifted relative to one another at pitches of 600 dpi in resolution. Details of the fine adjustment patterns are described later.

Next, in S611, the print medium P0 on which the fine adjustment patterns 702, 712 are formed is conveyed in the backward direction (Y2 direction) and then conveyed in the forward direction (Y1) to be re-fed for reading of the fine adjustment patterns. In the conveyance of the print medium P0 in the backward direction, the print medium P0 is conveyed in a distance greater than a distance in which the fine adjustment pattern 702 corresponding to the first adjustment item reaches the position of the optical sensor 111. Specifically, the print medium P0 is conveyed in the backward direction such that the fine adjustment pattern 702 is located upstream of the position of the optical sensor 111 in the forward conveyance direction. This conveyance is performed to remove slack in the print medium P0 as in the conveyance operation performed in S604.

Next, in S612, the position of the carriage 108 in the Z direction is changed and the distance L suitable for the reading of patterns is set. In S613, the fine adjustment patterns 702, 712 corresponding to the first and second adjustment items are read. First, the print medium P0 is conveyed in the forward direction such that the fine adjustment pattern 702 corresponding to the first adjustment item is disposed at the position of the optical sensor 111. Then, the carriage 108 performs scanning and the optical sensor 111 reads the fine adjustment pattern 702. Next, the print medium P0 is conveyed in the forward direction such that the fine adjustment pattern 712 corresponding to the second adjustment item is moved to the position of the optical sensor 111. Thereafter, the carriage 108 performs scanning in the main scanning direction and the optical sensor 111 reads the fine adjustment pattern 712.

Next, in S614, fine adjustment values β (β1, β2) are determined based on the reading results of the fine adjustment patterns 702, 712 corresponding to the respective adjustment items and printing position adjustment values γ (γ1, γ2) corresponding to the first and second adjustment items are determined. Specifically, the fine adjustment value β1 corresponding to the first adjustment item is determined and the printing position adjustment value γ1 is determined by adding up the rough adjustment value α1 and the fine adjustment value β1. Similarly, the fine adjustment value β2 corresponding to the second adjustment item is determined and the printing position adjustment value γ2 is determined by adding up the rough adjustment value α2 and the fine adjustment value β2. Note that, although the adjustment pattern reading and the determination of the adjustment values are performed in separate steps in this example, the adjustment value may be determined every time an adjustment pattern is read.

Thereafter, in the case where the printing and reading of all adjustment patterns and processing of determining the adjustment values are completed, the print medium P0 is discharged in S615.

Next, the rough adjustment patterns are described with reference to FIGS. 8A to 8C. FIG. 8A to 8C are views illustrating an example of the rough adjustment patterns 701, 711 used to roughly adjust the relative positional relationships between the printing position in the forward printing and the printing position in the return printing in the embodiment. In FIGS. 8A to 8C, the white dots 800 are dots printed in the forward printing and form a patch formation pattern 801. The dots 810 shaded by oblique lines are dots printed in the return printing and form a patch formation pattern 811. The dots 800, 810 are dots formed by the ink ejected from the same print head and are arranged at intervals of 600 dpi in both of the X direction and the Y direction.

FIG. 8A illustrates details of the patches 701a, 711a illustrated in FIG. 7. As each of the patches 701a, 711a, there is illustrated a patch which is a reference and which is formed in the case where the printing positions of the patch formation pattern 801 for the forward printing adjustment and the patch formation pattern 811 for the return printing adjustment are correct.

FIG. 8B illustrates details of each of the patches 701b, 711b illustrated in FIG. 7 and illustrates a patch formed in the case where the printing position of the patch formation pattern 811 for the return printing adjustment is shifted to the right (in a + direction) relative to the reference patch formation pattern 801 for the forward printing adjustment by an amount corresponding to 300 dpi×1.

FIG. 8C illustrates details of each of the patches 701c, 711c illustrated in FIG. 7 and illustrates a patch formed in the case where the printing position of the patch formation pattern 811 for the return printing adjustment is shifted to the right relative to the reference patch formation pattern 801 for the forward printing adjustment by an amount corresponding to 300 dpi×2.

The rough adjustment patterns in the embodiment are each set such that the greater the printing position of the patch formation pattern 811 for the return printing adjustment is shifted relative to the patch formation pattern 801 for the forward printing adjustment, the lower the printing density is. Specifically, in the patterns 801, 811 illustrated in FIG. 8A, dot coverage in print regions of these patterns is substantially 100%. In the case where the printing position of the patch formation pattern 811 for the return printing adjustment is shifted and an overlapping portion between the patterns 801, 811 becomes larger as in FIGS. 8B and 8C, the coverage decreases with this overlapping and the print density thus decreases.

Moreover, patches are formed by shifting the pattern 811 leftward (in a − direction) relative to the pattern 801 from FIG. 8A at pitches of 300 dpi. Accordingly, in this case, a pattern having a total of five patches including the reference patch, the two patches formed by the shifting the pattern 811 in the + direction at pitches of 300 dpi, and the two patches formed by shifting the pattern 811 in the − direction at pitches of 300 dpi is printed as the rough adjustment pattern.

Figure 9:
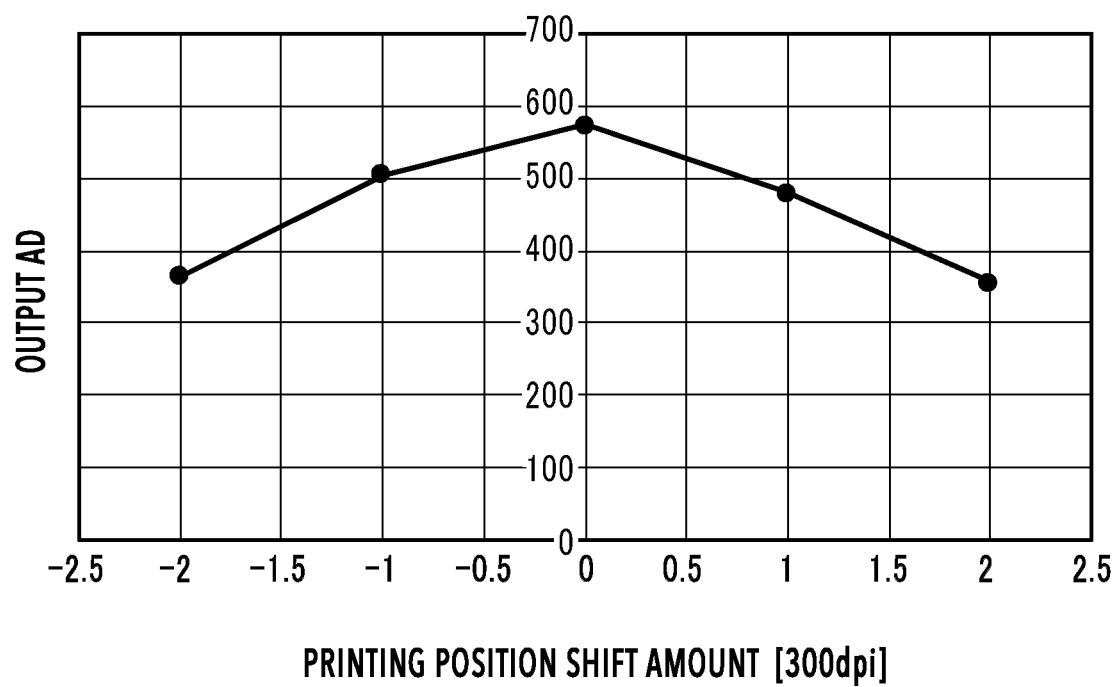
FIG. 9 is a view illustrating an output curve for a printing position shift amount in the rough adjustment pattern.

FIG. 9 is a view illustrating results obtained by the optical sensor 111 reading the print density of the aforementioned five patches in each rough adjustment pattern. As illustrated in FIG. 9, an AD output value (value obtained by receiving the reflected light and performing the A/D conversion) of the optical sensor 111 is a value corresponding to the shift amount of the printing position. A point where the A/D output value (reflection density) is greatest is determined based on the reading results, as the rough adjustment value for each of the forward printing and the return printing. In this case, the rough adjustment value can be determined by simply comparing numerical values of the output values obtained by reading the adjustment pattern. Moreover, a suitable rough adjustment value can be determined also by performing mathematical calculation such as internal division calculation. In other words, processing of determining a suitable rough adjustment value is performed depending on required printing position adjustment accuracy. The adjustment accuracy in this rough adjustment is about, for example, 600 dpi in terms of resolution on the print medium.

Note that the adjustment patterns 801, 811 can be used not only for the adjustment of the printing positions in the forward printing and the return printing using the same ink but also for other adjustment items. For example, the adjustment patterns 801, 811 can be used to execute adjustment items such as printing position adjustment between a nozzle array configured to eject the black ink and a nozzle array configured to eject the color ink (for example, cyan ink), printing position adjustment between odd-numbered nozzle arrays using the same ink, and printing position adjustment of a nozzle array for large dot formation and a nozzle array for small dot formation using the same ink.

FIGS. 10A to 10D are views illustrating an example of the fine adjustment patterns 702, 712 used to finely adjust the relative positional relationships between the position in the forward printing and the position in the return printing in the embodiment. In FIGS. 10A to 10D, the white dots 1000 are dots printed in the forward scanning and form a patch formation pattern 1001. The dots 1010 shaded by oblique lines are dots printed in the return scanning and form a patch formation pattern 1011. The dots 1000, 1010 are dots formed by the ink ejected from the same print head and are arranged at intervals of 600 dpi in both of the X direction and the Y direction.

Figure 10A:
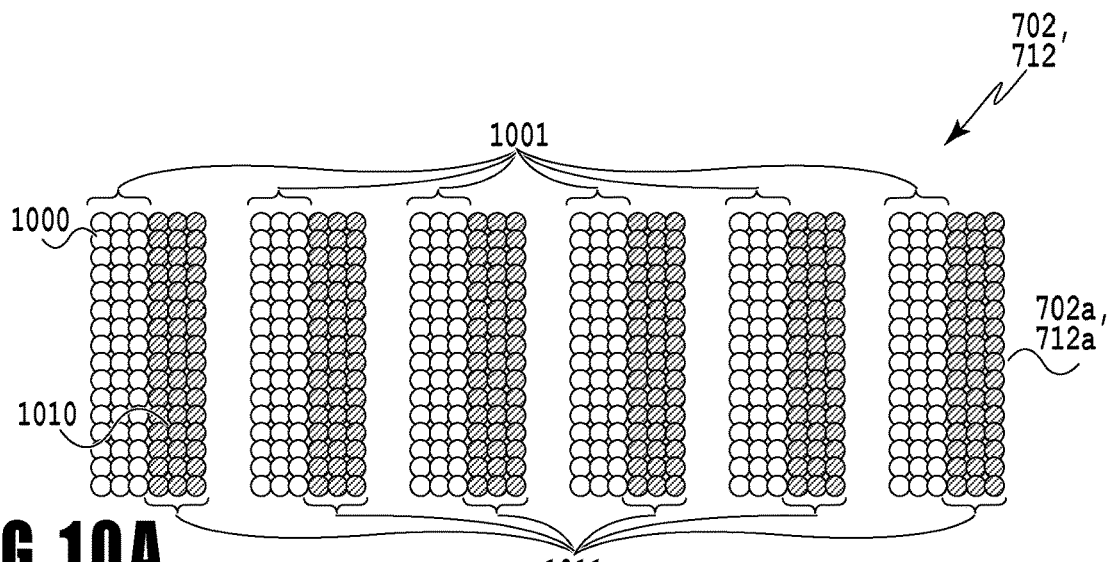
FIGS. 10A to 10D are views illustrating an example of a fine adjustment pattern.

FIG. 10A illustrates details of the patches 702a, 712a illustrated in FIG. 7. As each of the patches 702a, 712a, there is illustrated a patch which is formed in the case where the printing position of the patch formation pattern 1011 for the return printing adjustment is shifted rightward (in the + direction) relative to the reference patch formation pattern 1001 for the forward printing adjustment by an amount corresponding to 600 dpi×3.

Figure 10B:
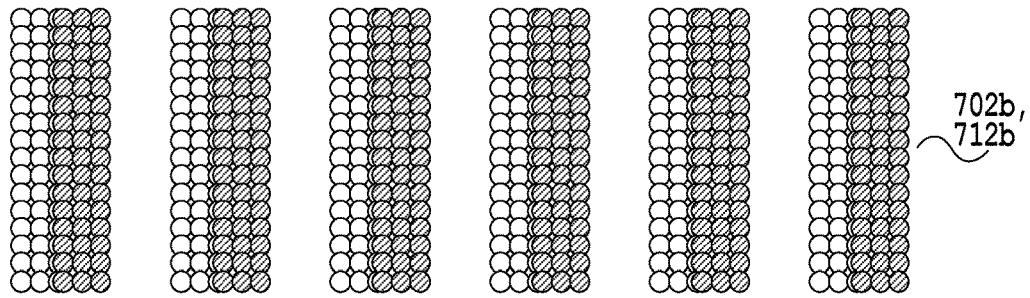

FIG. 10B illustrates details of the patches 702b, 712b illustrated in FIG. 7. As each of the patches 702b, 712b, there is illustrated a patch formed in the case where the printing position of the patch formation pattern 1011 for the return printing adjustment is shifted rightward (in the + direction) relative to the reference patch formation pattern 1001 for the forward printing adjustment by an amount corresponding to 600 dpi×2.

Figure 10C:
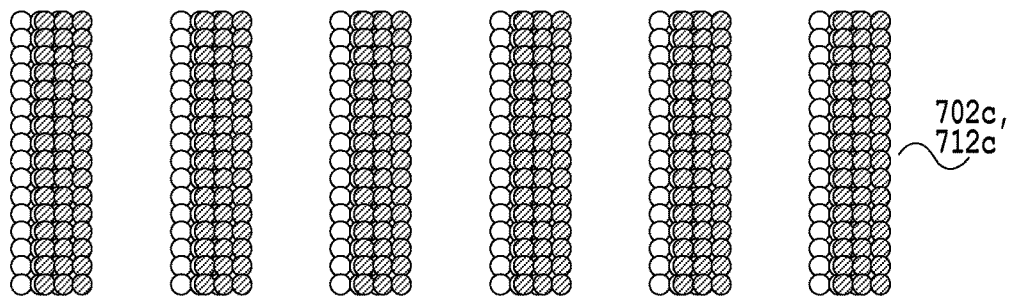

FIG. 10C illustrates details of the patches 702c, 712c illustrated in FIG. 7. As each of the patches 702c, 712c, there is illustrated a patch formed in the case where the printing position of the patch formation pattern 1011 for the return printing adjustment is shifted rightward (in the +direction) relative to the reference patch formation pattern 1001 for the forward printing adjustment by an amount corresponding to 600 dpi×1.

Figure 10D:
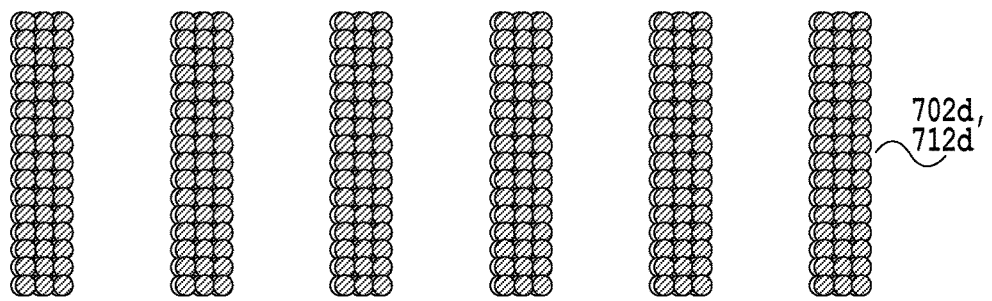

FIG. 10D illustrates details of the patches 702d, 712d illustrated in FIG. 7. As each of the patches 702d, 712d, there is illustrated a patch formed in the case where the printing positions of the patch formation pattern 1001 for the forward printing adjustment and the patch formation pattern 1011 for the return printing adjustment are both correct.

The rough adjustment values obtained by using the rough adjustment patterns are reflected in the formation of the patterns illustrated in FIG. 10D. Then, the printing position of the patch formation pattern 1011 for the return printing adjustment is shifted relative to the patch formation pattern 1001 for the forward printing adjustment in the pattern illustrated in FIG. 10D by steps to form the patches illustrated in FIGS. 10C, 10B, 10A.

Unlike the rough adjustment patterns, the fine adjustment patterns in the embodiment are each set such that the greater the printing position of the patch formation pattern 1011 for the return printing adjustment is shifted relative to the patch formation pattern 1001 for the forward printing adjustment, the higher the printing density is. Specifically, the coverage in the print region of FIG. 10D is the lowest. As the printing position is shifted and an overlapping portion between the patch formation patterns 1001, 1011 decreases as in FIGS. 10C, 10B, 10A, the coverage increases and the print density thus changes. Moreover, patches formed by shifting the patch formation pattern 1011 leftward (in the − direction) relative to the patch formation pattern 1001 from FIG. 10D at pitches of 600 dpi are similarly formed. Accordingly, in this case, a pattern having a total of seven patches including the pattern 1001 being the reference, the three patches obtained by shifting the patch formation pattern 1011 in the + direction at pitches of 600 dpi, and the three patches obtained by shifting the pattern 1011 in the − direction at pitches of 600 dpi is printed as the fine adjustment pattern.

Figure 11:
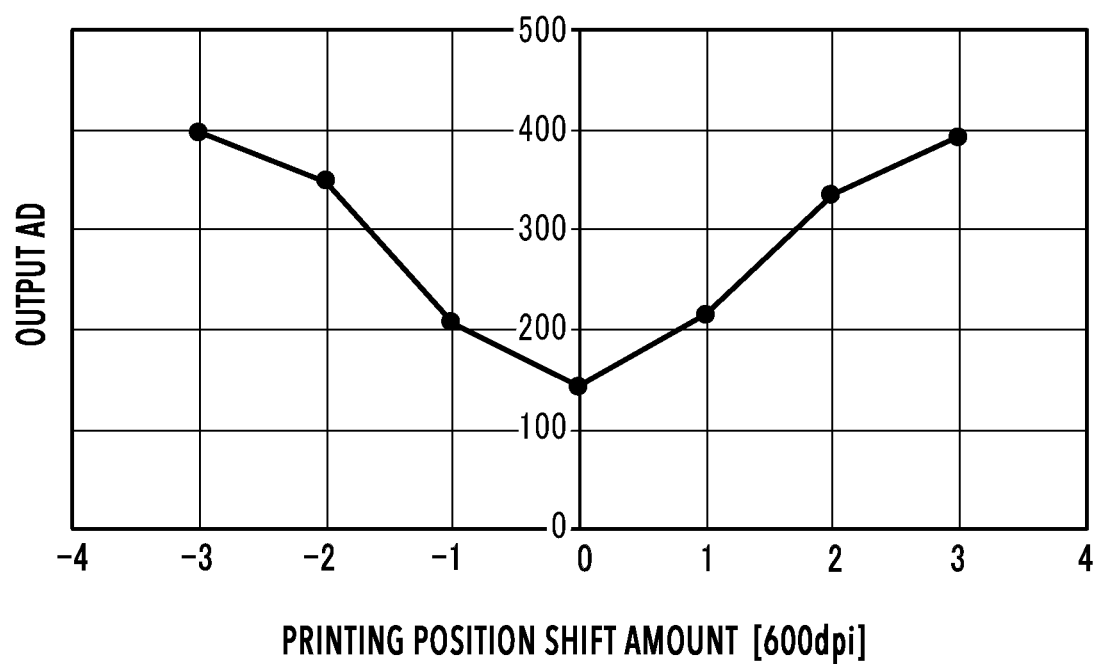
FIG. 11 is a view illustrating an output curve for a printing position shift amount in the fine adjustment pattern.

FIG. 11 is a view illustrating results obtained by the optical sensor 111 reading the print density of the aforementioned seven patches in each fine adjustment pattern. As illustrated in FIG. 11, the A/D output value of the optical sensor 111 is a value corresponding to the shift amount of the printing position. A point where the A/D output value (reflection density) is smallest is determined based on the reading results, as the fine adjustment value for each of the forward printing and the return printing. In this case, the fine adjustment value can be determined by simply comparing numerical values of the output values obtained by reading the adjustment pattern. Moreover, a suitable fine adjustment value can be determined also by performing mathematical calculation such as internal division calculation. In other words, processing of determining a suitable fine adjustment value is performed depending on required printing position adjustment accuracy. The adjustment accuracy in this fine adjustment is higher than that in the rough adjustment and can be about, for example, 2400 dpi in terms of resolution on the print medium.

Note that the patch formation patterns 1001, 1011 can be used not only for the adjustment of the printing positions in the forward printing and the return printing using the same ink but also for other adjustment items. For example, the adjustment patterns 1001, 1011 can be used to execute adjustment items such as printing position adjustment between a nozzle array configured to eject the black ink and a nozzle array configured to eject the color ink (for example, cyan ink), printing position adjustment between odd-numbered nozzle arrays using the same ink, and printing position adjustment of a nozzle array for large dot formation and a nozzle array for small dot formation using the same ink.

Moreover, in the embodiment, since there is a large time gap from the printing of the last rough adjustment pattern to the printing of the first fine adjustment pattern, there is a risk that the viscosity of the ink near the ejection ports of the print head increases and the ejection becomes unstable. Accordingly, the carriage 108 may be moved to the home position H at appropriate time intervals in the reading of the adjustment patterns to perform preliminary ejection.

Second Embodiment

Figure 12:
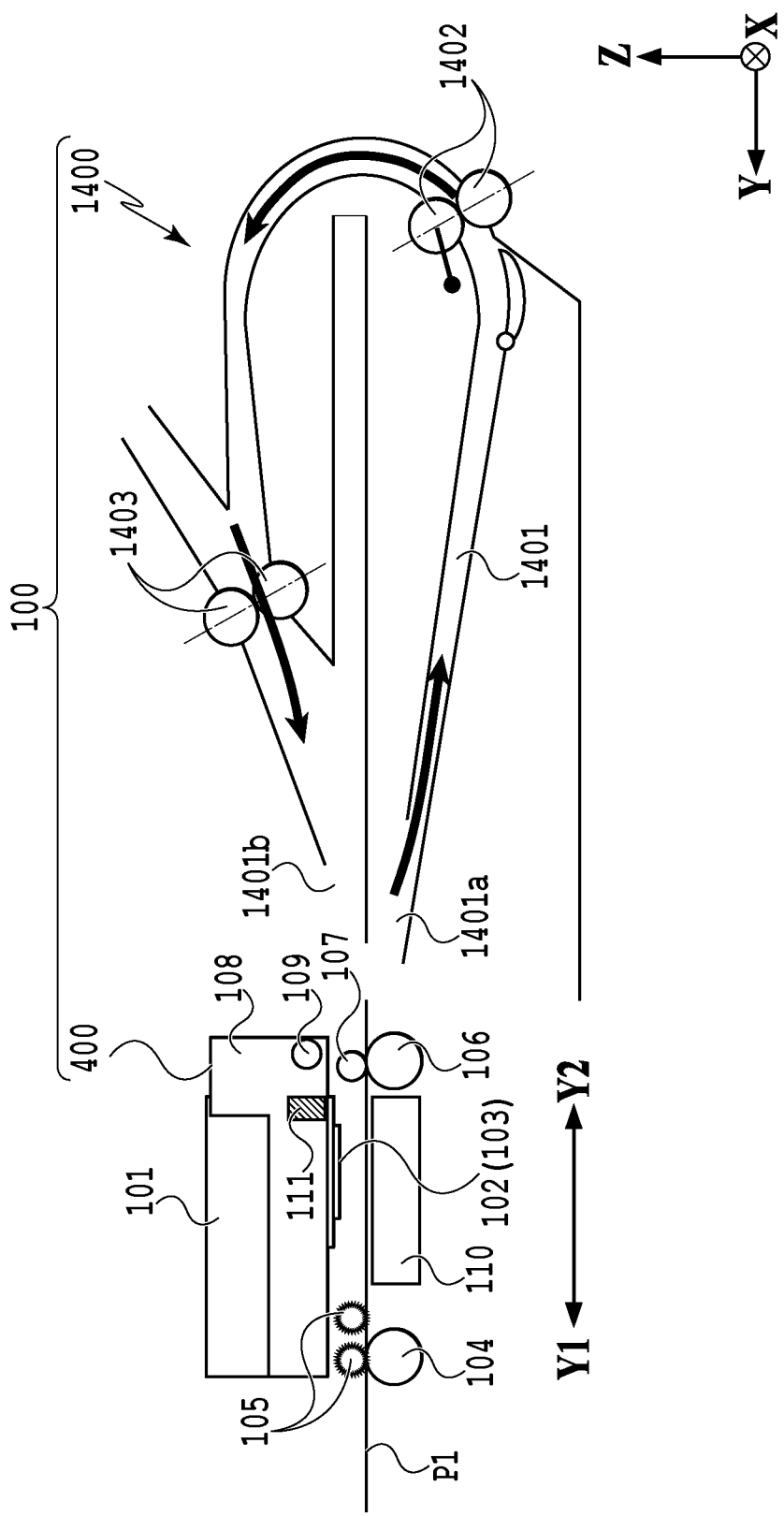
FIG. 12 is a side view illustrating an inkjet printing apparatus in a second embodiment.

Next, a second embodiment of the present invention is described with reference to FIGS. 12 to 14D and the like. FIG. 12 is a schematic view of an inkjet printing apparatus in the second embodiment. The printing apparatus 100 in the embodiment includes a printing apparatus main body 400 and a reversing mechanism 1400 which reverses the print medium to be supplied to the printing apparatus main body 400. The printing apparatus main body 200 has the same configuration as the printing apparatus 1 illustrated in FIG. 1 and detailed description of the printing apparatus main body 400 is omitted herein. The reversing mechanism 1400 is arranged upstream of the conveyance rollers 106 in the printing apparatus main body 400 and an annular reversing path 1401 is formed therein. A loading port 1401a and a discharge port 140 lb of the reversing path 1401 are arranged near the conveyance rollers 106 of the printing apparatus main body 400.

The print medium P conveyed in the printing apparatus 100 can be conveyed in the backward direction (Y2 direction) by the conveyance rollers 106 to be sent into the reversing path 1401 from the loading port 1401a. The print medium P sent into the reversing path 1401 is sent through the annular reversing path 1401 by an intermediate roller 1402 disposed in the reversing path 1401 toward an intermediate roller 1403 and is re-fed to the conveyance rollers 106 by the rotation of the intermediate roller 1403. During this operation, the positions of a first surface of the print medium P and a second surface opposite thereto are reversed. Specifically, the print medium P is re-fed to the printing apparatus with the first surface which has been the printing surface (front surface) facing the print head 101 in a stage before the passing of the reversing path 1401 being set to a non-printing surface not facing the print head and with the surface (second surface) opposite to the first surface being set to the printing surface.

Accordingly, the printing apparatus 100 can print images on both sides of the print medium P. Note that a control system relating to the embodiment is the same as that illustrated in FIG. 3. Moreover, the CPU 300 controls drive of a sheet feed motor (not illustrated) which is a drive source of the intermediate rollers 1402, 1403.

Figure 13:
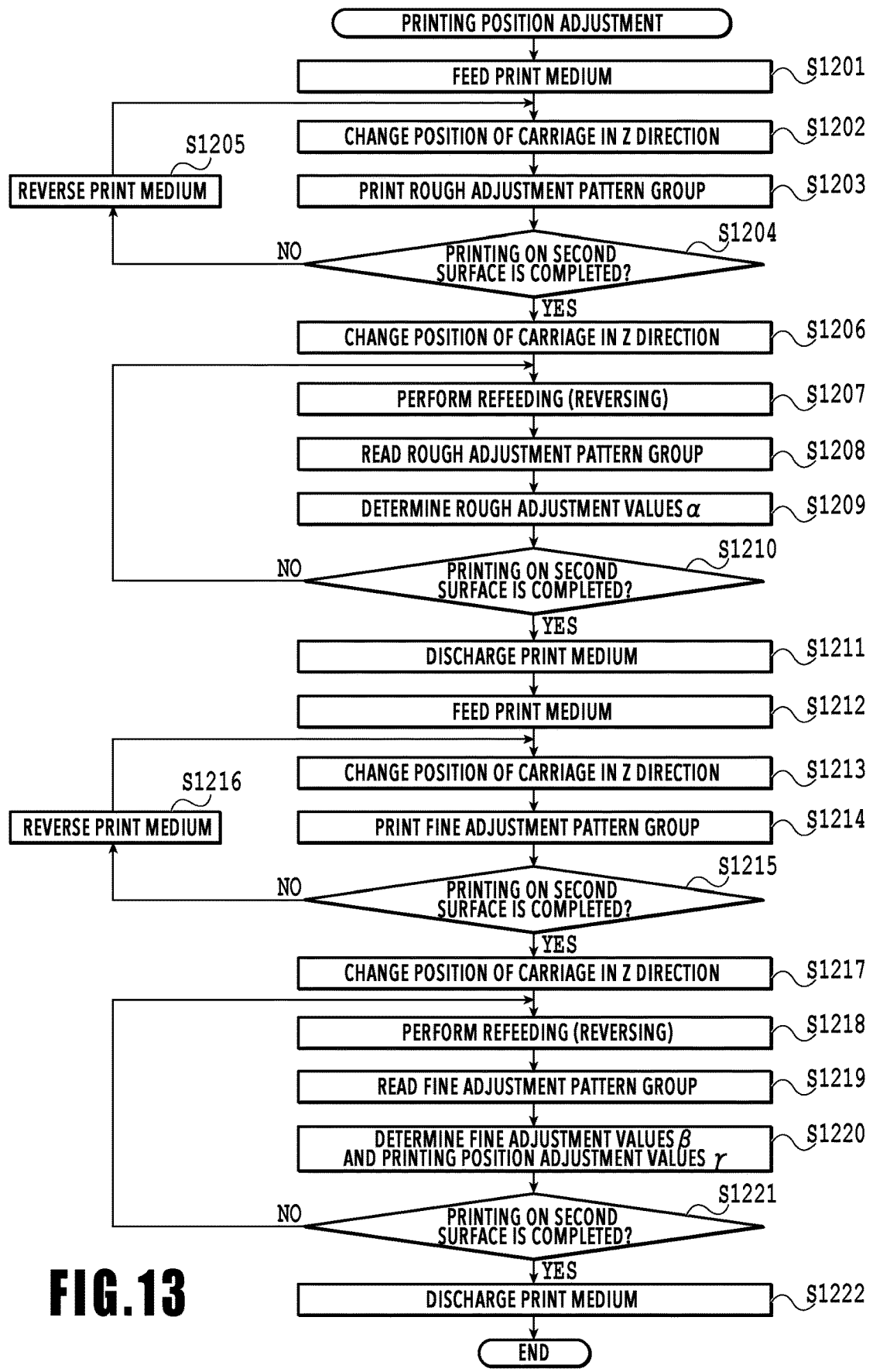
FIG. 13 is a flowchart illustrating a printing position adjustment process in the second embodiment.

FIG. 13 is a flowchart illustrating a printing position adjustment process executed by the printing apparatus 100. Moreover, FIGS. 14A to 14D are views illustrating an example of a layout of the printing position adjustment pattern. In FIG. 13, first, in S1201, a print medium P1 to be used to print adjustment patterns is fed and conveyed to a region where the print medium P1 is held by the roller pair including the conveyance rollers 106 and the pinch rollers 107 and the roller pair including the sheet discharge rollers 104 and the spurs 105 between these rollers. Next, in S1202, the position of the carriage 108 in the Z direction is changed such that the sheet gap is changed to a desired sheet gap. For example, the sheet gap is changed to a sheet gap suitable for printing on plain paper.

Next, in S1203, a rough adjustment pattern 1301 corresponding to the first adjustment item and a rough adjustment pattern 1311 corresponding to the second adjustment item are printed on the first surface of the print medium P1 (see FIG. 14A). The rough adjustment pattern 1301 is a pattern for roughly adjusting relative positional relationships between a printing position in forward printing using the black pigment ink and a printing position in return printing using the same. Moreover, the rough adjustment pattern 1311 is a pattern for roughly adjusting relative positional relationships between a printing position in forward printing using the cyan ink and a printing position in return printing using the same. These rough adjustment patterns 1301, 1311 are formed of multiple patches printed with the printing position in the return printing shifted relative to the printing position in the forward printing at pitches of 300 dpi in resolution.

Next, in S1204, the printing apparatus 100 determines whether printing on the second surface of the print medium P1 is completed. Since the printing on the second surface is not completed in this stage, the processing proceeds to S1205. In S1205, the print medium P1 is reversed by using the reversing mechanism 1400 and is fed to the printing apparatus main body 400 with the second surface set to the printing surface. Then, the fed print medium P1 is conveyed to the region where the print medium P1 is held by the roller pair including the conveyance rollers 106 and the pinch rollers 107 and the roller pair including the sheet discharge rollers 104 and the spurs 105 between these rollers.

Next, in S1202, the position of the carriage 108 in the Z direction is changed such that the sheet gap is changed to a sheet gap different from the previous one. For example, the sheet gap is changed to a sheet gap suitable for printing on special paper. Next, in S1203, a rough adjustment pattern 1321 corresponding to a third adjustment item and a rough adjustment pattern 1331 corresponding to a fourth adjustment item are printed on the second surface of the print medium P1 (see FIG. 14B). The rough adjustment pattern 1321 corresponding to the third adjustment item is a pattern for roughly adjusting relative positional relationships between a printing position in forward printing using the black pigment ink and a printing position in return printing using the same. Moreover, the rough adjustment pattern 1331 corresponding to the fourth adjustment item is a pattern for roughly adjusting relative positional relationships between a printing position in forward printing using the cyan ink and a printing position in return printing using the same. These rough adjustment patterns 1321, 1331 are formed of multiple patches printed with the printing position in the return printing shifted relative to the printing position in the forward printing at pitches of 300 dpi in resolution.

The adjustment patterns 1301, 1311 printed on the first surface of the print medium P1 and the adjustment patterns 1321, 1331 printed on the second surface are printed at positions not overlapping one another so as not to affect one another in the reading by the optical sensor 111.

Next, in S1204, the printing apparatus 100 determines whether the printing on the second surface is completed. Since the printing on the second surface is completed in this stage, the processing proceeds to S1206. In S1206, the position of the carriage 108 in the Z direction is changed such that the distance between the optical sensor 111 and the print medium P1 is changed to a distance suitable for reading of the patterns. Next, in S1207, the printing apparatus 100 reverses the print medium P1 by using the reversing mechanism 1400 and feeds the print medium P1 to read the adjustment patterns printed on the first surface.

Next, in S1208, the rough adjustment patterns corresponding to the respective adjustment items printed with the sheet gap suitable for the printing on plain sheet are read. Specifically, first, the print medium P1 is conveyed in the forward direction such that the rough adjustment pattern 1301 corresponding to the first adjustment item is disposed at the position of the optical sensor 111. Thereafter, the carriage 108 preforms scanning and the optical sensor 111 reads the rough adjustment pattern 1301 printed on the first surface. Next, the print medium P1 is conveyed in the forward direction such that the rough adjustment pattern 1311 corresponding to the second adjustment item is disposed at the position of the optical sensor 111. Then, the carriage 108 performs scanning in the main scanning direction and the optical sensor 111 reads the rough adjustment pattern 1311.

Next, in S1209, rough adjustment values α (α1, α2) are determined based on the reading results of the rough adjustment patterns corresponding to the respective adjustment items printed with the sheet gap suitable for the printing on plain paper. Specifically, the rough adjustment value α1 for the first adjustment item and the rough adjustment value α2 for the second adjustment item are determined. Note that, although the reading of the adjustment patterns and the determination of the adjustment values are performed in separate steps in this example, the adjustment value may be determined every time an adjustment pattern is read.

Next, in S1210, the printing apparatus 100 determines whether the reading of the second surface of the print medium P1 is completed. Since the reading of the second surface is not completed in this stage, the processing proceeds to S1207. In S1207, the printing apparatus 100 reverses the print medium P1 by using the reversing mechanism 1400 and re-feeds the print medium P1 to read the adjustment patterns printed on the second surface.

Next, in S1208, the rough adjustment patterns corresponding to the respective adjustment items printed with the sheet gap suitable for special paper are read. Specifically, first, the print medium P1 is conveyed in the forward direction such that the rough adjustment pattern 1321 corresponding to the third adjustment item is disposed at the position of the optical sensor 111. Thereafter, the carriage 108 performs scanning and the optical sensor 111 reads the rough adjustment pattern 1321 printed on the second surface. Next, the print medium P1 is conveyed in the forward direction such that the rough adjustment pattern 1331 corresponding to the fourth adjustment item is disposed at the position of the optical sensor 111. Then, the carriage 108 performs scanning and the optical sensor 111 reads the rough adjustment pattern 1331.

Next, in S1209, rough adjustment values α (α3, α4) are determined based on the reading results of the rough adjustment patterns corresponding to the respective adjustment items printed with the sheet gap suitable for the printing of special paper. Specifically, the rough adjustment value α3 for the third adjustment item and the rough adjustment value α4 for the fourth adjustment item are determined.

Next, in S1210, the printing apparatus 100 determines whether the reading of the second surface of the print medium P1 is completed. Since the reading of the second surface is completed in this stage, the processing proceeds to S1211 and the print medium P1 is discharged.

In the case where the printing and reading of the adjustment patterns on the first sheet is completed, in S1212, the second print medium P2 to be used to print the following adjustment patterns is fed. Then, the fed print medium P2 is conveyed to the region where the print medium P2 is held by the roller pair including the conveyance rollers 106 and the pinch rollers 107 and the roller pair including the sheet discharge rollers 104 and the spurs 105 between these rollers.

Next, in S1213, the carriage 108 is moved in the Z direction such that the sheet gap is set to the same sheet gap as that in the case where the rough adjustment pattern 1301 corresponding to the first adjustment item and the rough adjustment pattern 1311 corresponding to the second adjustment item are printed. In other words, the sheet gap is changed to the sheet gap suitable for the printing on plain sheet.

Next, in S1214, a fine adjustment pattern 1302 corresponding to the first adjustment item and a fine adjustment pattern 1312 corresponding to the second adjustment item are printed on the first surface of the print medium P2 (see FIG. 14C). The fine adjustment pattern 1302 corresponding to the first adjustment item is a pattern for finely adjusting relative positional relationships between the printing position in the forward printing using the black pigment ink and the printing position in the return printing using the same. Moreover, the fine adjustment pattern 1312 corresponding to the second adjustment item is a pattern for finely adjusting the relative positional relationships between the printing position in the forward printing using the cyan ink and the printing position in the return printing using the same. These fine adjustment patterns 1302, 1312 are formed of multiple patches printed with the printing position in the return printing shifted relative to the printing position in the forward printing at pitches of 600 dpi in resolution.

Next, in S1215, the printing apparatus 100 determines whether the printing on the second surface of the print medium P2 is completed. Since the printing on the second surface is not completed in this stage, the processing proceeds to S1216. In S1216, the print medium P2 is reversed by using the reversing mechanism 1400 and is fed to the printing apparatus main body 400 with the second surface set to the printing surface. Then, the fed print medium P2 is conveyed to the region where the print medium P2 is held by the roller pair including the conveyance rollers 106 and the pinch rollers 107 and the roller pair including the sheet discharge rollers 104 and the spurs 105 between these rollers.

Next, in S1213, the carriage 108 is moved such that the sheet gap is set to the same sheet gap as that in the case where the rough adjustment pattern 1321 corresponding to the third adjustment item and the rough adjustment pattern 1331 corresponding to the fourth adjustment item are printed. In other words, the sheet gap is changed to the sheet gap suitable for the printing on special paper.

Next, in S1214, a fine adjustment pattern 1322 corresponding to the third adjustment item and a fine adjustment pattern 1332 corresponding to the fourth adjustment item are printed on the second surface of the print medium P2 (see FIG. 14D). The fine adjustment pattern 1322 corresponding to the third adjustment item is a pattern for finely adjusting the relative positional relationships between the printing position in the forward printing using the black pigment ink and the printing position in the return printing using the same. The fine adjustment pattern 1332 corresponding to the fourth adjustment item is a pattern for finely adjusting the relative positional relationships between the printing position in the forward printing using the cyan ink and the printing position in the return printing using the same. These fine adjustment patterns 1322, 1332 are formed of multiple patches printed with the printing position in the return printing shifted relative to printing positions in the forward printing at pitches of 600 dpi in resolution.

The adjustment patterns 1302, 1312 printed on the first surface of the print medium P2 and the adjustment patterns 1322, 1332 printed on the second surface are printed at positions not overlapping one another so as not to affect one another in the reading by the optical sensor 111.

Next, in S1215, the printing apparatus 100 determines whether the printing on the second surface is completed. Since the printing on the second surface is completed in this stage, the processing proceeds to S1217. In S1217, the position of the carriage 108 in the Z direction is changed such that the distance between the optical sensor 111 and the print medium P2 is changed to a distance suitable for reading of the patterns. Next, in S1218, the printing apparatus 100 reverses the print medium P2 by using the reversing mechanism 1400 and feeds the print medium P2 to read the adjustment patterns printed on the first surface.

Next, in S1219, the fine adjustment patterns corresponding to the respective adjustment items printed with the sheet gap suitable for the printing on plain sheet are read. Specifically, first, the print medium P2 is conveyed in the forward direction such that the fine adjustment pattern 1302 corresponding to the first adjustment item is disposed at the position of the optical sensor 111. Thereafter, the carriage 108 performs scanning in the main scanning direction and the optical sensor 111 reads the fine adjustment pattern 1302 printed on the first surface. Next, the print medium P2 is conveyed in the forward direction such that the fine adjustment pattern 1312 corresponding to the second adjustment item is disposed at the position of the optical sensor 111. Then, the carriage 108 performs scanning in the main scanning direction and the optical sensor 111 reads the fine adjustment pattern 1312.

Next, in S1220, fine adjustment values $\beta$ are determined based on the reading results of the fine adjustment patterns corresponding to the respective adjustment items printed with the sheet gap suitable for the printing on plain paper and printing position adjustment values $\gamma$ are determined by using the rough adjustment values $\alpha$ and the fine adjustment values $\beta$. Specifically, the fine adjustment value $\beta1$ corresponding to the first adjustment item is determined and the printing position adjustment value $\gamma1$ for the first adjustment item is determined by adding up $\alpha1$ and $\beta1$. Similarly, the fine adjustment value $\beta2$ corresponding to the second adjustment item is determined and the printing position adjustment value $\gamma2$ for the second adjustment item is determined by adding up $\alpha2$ and $\beta2$. Note that, although the reading of the adjustment patterns and the determination of the adjustment values are performed in separate steps in this example, the adjustment value may be determined every time an adjustment pattern is read.

Next, in S1221, the printing apparatus 100 determines whether the reading of the second surface of the print medium P2 is completed. Since the reading of the second surface is not completed in this stage, the processing proceeds to S1218. In S1218, the printing apparatus 100 reverses the print medium P2 by using the reversing mechanism 1400 and refeeds the print medium P2 to read the adjustment patterns printed on the second surface.

Next, in S1219, the fine adjustment pattern corresponding to the respective adjustment items printed with the sheet gap suitable for the printing on special sheet are read. Specifically, first, the print medium P2 is conveyed in the forward direction such that the fine adjustment pattern 1322 corresponding to the third adjustment item is disposed at the position of the optical sensor 111. Thereafter, the carriage 108 performs scanning and the optical sensor 111 reads the fine adjustment pattern 1322 printed on the second surface. Next, the print medium P2 is conveyed in the forward direction such that the fine adjustment pattern 1332 corresponding to the fourth adjustment item is disposed at the position of the optical sensor 111. Then, the carriage 108 performs scanning in the main scanning direction and the optical sensor 111 reads the fine adjustment pattern 1332.

Next, in S1220, fine adjustment values $\beta$ are determined based on the reading results of the fine adjustment patterns corresponding to the respective adjustment items printed with the sheet gap suitable for the printing on special paper and printing position adjustment values $\gamma$ are determined by using the rough adjustment values $\alpha$ and the fine adjustment values $\beta$. Specifically, the fine adjustment value $\beta3$ for the third adjustment item is determined and the printing position adjustment value $\gamma3$ for the third adjustment item is determined by adding up $\alpha3$ and $\beta3$. Similarly, the fine adjustment value $\beta4$ for the fourth adjustment item is determined and the printing position adjustment value $\gamma4$ for the fourth adjustment value is determined by adding up $\alpha4$ and $\beta4$.

Next, in S1221, the printing apparatus 100 determines whether the reading of the second surface is completed. Since the reading of the second surface is completed in this stage, the processing proceeds to S1222 and the print medium P2 is discharged.

Note that, also in this embodiment, as in the aforementioned first embodiment, the carriage 108 may be moved to the home position H at appropriate time intervals in the reading of the adjustment patterns to perform preliminary ejection of the print head. For example, the preliminary ejection may be performed in the reading of the adjustment patterns in S1208.

Moreover, in the case where the print medium P1 is fed to print the printing position adjustment patterns in S1201 or the case where the print medium P2 is fed in S1212, the printing apparatus 100 may check the width (length in the X direction) of the print medium. For example, in the case where the size of the print medium to be used for the adjustment of the printing positions is A4/LTR, the printing apparatus 100 checks whether the width of the actually-fed print medium is A4 or greater by using the optical sensor 111 and, if the width is determined to be smaller than A4/LTR, determines that there is an error. This can prevent occurrence of missing adjustment pattern and the like due to insufficient print medium size.

Moreover, the printing apparatus 100 may detect the length (length in the Y direction) of the print medium in the conveyance direction after printing the adjustment patterns on one surface of each of the print media P1, P2 and, if the detected length of the print medium is equal to or smaller than the size necessary for the printing of the adjustment patterns, determine that there is an error. This can prevent occurrence of overlapping of the patterns on the front and back surfaces of the print medium due to insufficient print medium size. The length of the print medium in the conveyance direction can be obtained by detecting a leading end and a trailing end of the print medium with a trailing end detection sensor provided in a movement path of the print medium and calculating the length based on a conveyance amount of the print medium (rotation amount of the conveyance rollers) between the leading and the trailing end.

Moreover, the reading accuracy may be improved by obtaining an error in the conveyance direction of the print medium after cueing of the recording medium for the reading in the S1208, S1219. For example, the following method can be employed as a method for obtaining the error. First, a patch PT (see FIG. 14A) for reading accuracy adjustment is printed upstream of the adjustment patterns in conveyance direction. The patch PT is read prior to the reading of the adjustment pattern 1301. In this case, the optical sensor reads end portions of the patch PT and the center of the patch is obtained from the positions of the read end portions. The error in the position of the print medium is calculated based on the position of the center of the patch. Thereafter, the print medium is conveyed with the conveyance amount corrected such that the calculated error is canceled.

Generally, in the conveyance for the cueing, the conveyance distance is long and a large error tends to occur. Accordingly, after the calculation of the error, the conveyance amount is controlled such that the error is canceled in the conveyance operation of the print medium from the cueing position to the reading of the adjustment patterns. The optical sensor and the adjustment patterns can be thereby set to desired positional relationships in the reading operation of the adjustment patterns. Performing the conveyance thereafter according to the setting enables accurate reading of the adjustment patterns.

Although the adjustment patterns are printed on the first and second surfaces of the print media in the printing apparatus 100 according to the second embodiment, all adjustment patterns may be printed on the first surface of one print medium as in the first embodiment. In this case, an accurate reading operation can be performed by conveying the print medium in the backward direction and then conveying the print medium in the forward direction without reversing the print medium.

Moreover, in the aforementioned embodiment, after the printing on the first and second surfaces of each print medium, the print medium is reversed and the multiple adjustment patterns printed on the first surface are continuously read. Then the print medium is reversed and the multiple adjustment patterns printed on the second surface are continuously read.

However, the printing apparatus may print the adjustment patterns on the first surface and then read the adjustment patterns printed on the first surface by conveying the print medium in the backward direction and then in the forward direction without reversing the print medium. In this case, after the completion of the reading of the first surface, the printing apparatus reverses the print medium, performs printing on the second surface, and reads the adjustment patterns printed on the second surface by conveying the print medium in the backward direction and then in the forward direction as in the reading of the first surface,. The printing and the reading of the adjustment patterns on both surfaces may be performed in such a process.

In the case of employing either of the processes, if multiple adjustment patterns among the adjustment patterns corresponding to the multiple adjustment items can be printed in the same printing condition, these multiple adjustment patterns are printed continuously and the printed adjustment patterns are read continuously. Printing and reading the adjustment patterns in such a method enables more efficient printing and reading of the adjustment patterns than those in the conventional printing apparatus also in the case where the printing is performed on both surfaces in either of the processes described above.

Other Embodiments

The present invention can be widely applied not only to the inkjet printing apparatus but also to printing apparatuses employing other printing methods. Moreover, the present invention can be applied not only to the aforementioned serial printing apparatus but also to a so-called full-line printing apparatus which uses a long print head extending over the entire print region of the print medium in the width direction thereof. Moreover, the print adjustment patterns are not limited to those in the aforementioned embodiments and any pattern can be used as long as the adjustment values of the printing position adjustment can be obtained based on the reading results of the reading unit.

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2018-145430 filed Aug. 1, 2018, which is hereby incorporated by reference herein in its entirety.

What is claimed is:

1. A printing apparatus comprising:
   a conveying unit configured to convey a print medium in a forward direction being a direction in which the print medium is discharged and in a backward direction opposite to the forward direction;
   a printing unit configured to perform printing on the print medium conveyed by the conveying unit;
   a print controlling unit configured to cause the printing unit to print a plurality of adjustment patterns on the print medium, the adjustment patterns being for use to adjust a printing position of the printing unit on the print medium and corresponding respectively to a plurality of printing position adjustment items; and
   a reading unit configured to read the adjustment patterns printed on the print medium at a reading position on a conveyance path of the conveying unit, wherein
   the print controlling unit causes the printing unit to print the plurality of adjustment patterns on the print medium while the conveying unit conveys the print medium in the forward direction,
   then, the conveying unit conveys the print medium in the backward direction until the plurality of the adjustment patterns are moved beyond the reading position in the backward direction and then conveys the print medium in the forward direction again to cause the adjustment patterns to reach the reading position, and
   the reading unit continuously reads the plurality of adjustment patterns at the reading position while the conveying unit conveys the print medium in the forward direction.

2. The printing apparatus according to claim 1, wherein, after the reading unit continuously reads the plurality of adjustment patterns at the reading position, the print medium is conveyed in the forward direction,
   the print controlling unit causes the printing unit to print an additional adjustment pattern on the print medium on which the plurality of adjustment patterns are printed, the additional adjustment pattern being for use to adjust the printing position of the printing unit on the print medium.

3. The printing apparatus according to claim 2, wherein the print controlling unit causes the printing unit to print the additional adjustment pattern based on reading results of the plurality of the adjustment patterns obtained by the reading unit.

4. The printing apparatus according to claim 3, wherein
   the plurality of adjustment patterns are used to adjust the printing position with first adjustment accuracy, and
   the additional adjustment pattern is used to adjust the printing position with second adjustment accuracy higher than the first adjustment accuracy.

5. The printing apparatus according to claim 1, further comprising:
   a carriage on which the printing unit and the reading unit are mounted and which is movable in a main scanning direction intersecting the forward direction; and
   a change unit configured to change a distance between the carriage and the print medium in a direction perpendicular to a surface of the print medium, wherein the changing unit changes the distance after the printing unit prints the plurality of adjustment patterns on the print medium, before the reading unit reads the plurality of adjustment patterns at the reading position.

6. The printing apparatus according to claim 5, wherein the print medium is reversed while the distance is changed.

7. The printing apparatus according to claim 1, further comprising a reversing unit configured to reverse the print medium which is conveyed in the backward direction by the conveying unit.

8. The printing apparatus according to claim 7, wherein a plurality of different adjustment patterns for adjusting the printing position on the print medium by the printing unit is printed on a back surface of the print medium on which the adjustment patterns are printed and which is reversed.

9. The printing apparatus according to claim 8, wherein after the reversing unit reverses the print medium whose front surface is printed with the adjustment patterns and whose back surface is printed with the different adjustment patterns, the conveying unit conveys the print medium in the forward direction again to cause the adjustment patterns to reach the reading position, and the reading unit continuously reads the plurality of adjustment patterns printed on the front surface at the reading position while the conveying unit conveys the print medium in the forward direction.

10. The printing apparatus according to claim 9, wherein after the plurality of adjustment patterns printed on the front surface are continuously read, the reversing unit further reverses the print medium which is conveyed in the backward direction by the conveying unit, and the conveying unit conveys the print medium in the forward direction again to cause the different adjustment patterns to reach the reading position, and the reading unit continuously reads the plurality of different adjustment patterns printed on the back surface at the reading position while the conveying unit conveys the print medium in the forward direction.

11. The printing apparatus according to claim 1, further comprising an adjustment value setting unit which sets adjustment values of the printing position of the printing unit based on reading results obtained by the reading unit, wherein
    the print controlling unit controls the printing position of the printing unit on the print medium based on the adjustment values set by the adjustment value setting unit.

12. The printing apparatus according to claim 1, wherein
    the conveying unit includes a conveyance roller arranged upstream of the printing unit and the reading unit in the forward direction and a sheet discharge roller arranged downstream of the printing unit and the reading unit in the forward direction, and
    a rotation amount of the sheet discharge roller when the print medium is conveyed is greater than a rotation amount of the conveyance roller.

13. The printing apparatus according to claim 1, the conveying unit conveys the print medium while applying tension to the print medium in a forward direction being a direction in which the print medium is discharged.

14. The printing apparatus according to claim 1, the print controlling unit causes the printing unit to print the plurality of adjustment patterns on the print medium while the conveying unit conveys the print medium in the forward direction without conveying in the backward direction,
    then, the conveying unit conveys the print medium in the backward direction until the plurality of the adjustment patterns are moved beyond the reading position in the backward direction and then conveys the print medium in the forward direction again to cause the adjustment patterns to reach the reading position, and the reading unit continuously reads the plurality of adjustment patterns at the reading position while the conveying unit conveys the print medium in the forward direction without conveying in the backward direction.

15. A printing method of performing printing by using a conveying unit configured to convey a print medium in a forward direction being a direction in which the print medium is discharged and in a backward direction opposite to the forward direction, a printing unit configured to perform printing on the print medium conveyed by the conveying unit, and a reading unit configured to read patterns printed on the print medium at a reading position on a conveyance path of the conveying unit, the printing method comprising the steps of:

causing the printing unit to print a plurality of adjustment patterns on the print medium, with the adjustment patterns being for use adjust a printing position of the printing unit on the print medium and corresponding respectively to a plurality of printing position adjustment items, while causing the conveying unit to convey the print medium in the forward direction;

causing the conveying unit to convey the print medium in the backward direction until the plurality of the adjustment patterns are moved beyond the reading position in the backward direction;

after the print medium is conveyed in the backward direction, causing the conveying unit to convey the print medium in the forward direction again to cause the adjustment patterns to reach the reading position; and after the adjustment patterns reach the reading position, causing the reading unit to continuously read the plurality of adjustment patterns at the reading position while causing the conveying unit to convey the print medium in the forward direction.

16. The printing method according to claim 15, wherein, after the reading unit continuously reads the plurality of adjustment patterns at the reading position, the print medium is conveyed in the forward direction, the printing unit is caused to print an additional adjustment pattern on the print medium on which the plurality of adjustment patterns are printed, the additional adjustment pattern being for use to adjust the printing position of the printing unit on the print medium.

17. The printing method according to claim 16, wherein the printing unit is caused to print the additional adjustment pattern based on reading results of the plurality of the adjustment patterns obtained by the reading unit.

18. The printing method according to claim 17, wherein the plurality of adjustment patterns are used to adjust the printing position with first adjustment accuracy, and the additional adjustment pattern is used to adjust the printing position with second adjustment accuracy higher than the first adjustment accuracy.

19. The printing method according to claim 15, further comprising reversing the print medium which is conveyed in the backward direction by the conveying unit.

20. The printing method according to claim 19, wherein a plurality of different adjustment patterns for adjusting the printing position on the print medium by the printing unit is printed on a back surface of the print medium on which the adjustment patterns are printed and which is reversed.

21. The printing method according to claim 20, wherein after reversing unit reverses the print medium whose front surface is printed with the adjustment patterns and whose back surface is printed with the different adjustment patterns, the conveying unit conveys the print medium in the forward direction again to cause the adjustment patterns to reach the reading position, and the reading unit continuously reads the plurality of adjustment patterns printed on the front surface at the reading position while the conveying unit conveys the print medium in the forward direction.

22. The printing method according to claim 21, wherein after the plurality of adjustment patterns printed on the front surface are continuously read, the print medium which is conveyed in the backward direction by the conveying unit is further reversed, and the conveying unit conveys the print medium in the forward direction again to cause the different adjustment patterns to reach the reading position, and the reading unit continuously reads the plurality of different adjustment patterns printed on the back surface at the reading position while the conveying unit conveys the print medium in the forward direction.

* * * * *